(12) United States Patent
Hayakawa et al.

(10) Patent No.: US 7,658,426 B2
(45) Date of Patent: Feb. 9, 2010

(54) FOAM-MOLDED MEMBER HAVING SKIN AND METHOD OF MANUFACTURING FOAM-MOLDED MEMBER HAVING SKIN

(75) Inventors: Kazutaka Hayakawa, Ebina (JP); Takeshi Yoshida, Ebina (JP); Yoshiyuki Takahashi, Ebina (JP); Fumio Saito, Sagamihara (JP); Kenichi Ochiai, Atsugi (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 19 days.

(21) Appl. No.: 12/101,202

(22) Filed: Apr. 11, 2008

(65) Prior Publication Data

US 2008/0250721 A1      Oct. 16, 2008

(30) Foreign Application Priority Data

Apr. 16, 2007  (JP) .......................... 2007-107142
Dec. 26, 2007  (JP) .......................... 2007-334831

(51) Int. Cl.
*B60R 13/01* (2006.01)

(52) U.S. Cl. ................................................. 296/39.1

(58) Field of Classification Search ............... 296/39.1, 296/37.16
See application file for complete search history.

(56) References Cited

U.S. PATENT DOCUMENTS

| | | | |
|---|---|---|---|
| 4,722,563 A * | 2/1988 | Loren et al. ................. 293/120 |
| 4,783,114 A * | 11/1988 | Welch ......................... 296/153 |
| 4,810,452 A * | 3/1989 | Taillefert et al. ............. 264/247 |
| 5,536,351 A * | 7/1996 | Rheinlander et al. ......... 156/212 |
| 5,582,789 A * | 12/1996 | Stein et al. .................. 264/46.4 |
| 6,447,047 B1 * | 9/2002 | Marcovecchio et al. .. 296/146.7 |
| 6,821,465 B1 * | 11/2004 | Stein et al. .................... 264/83 |
| 7,108,312 B2 * | 9/2006 | Cowelchuk et al. ....... 296/146.7 |
| 7,387,326 B2 * | 6/2008 | Osada ......................... 296/39.1 |
| 2002/0125734 A1 * | 9/2002 | Pokorzynski et al. .... 296/146.7 |
| 2005/0200161 A1 * | 9/2005 | Reed et al. .................. 296/153 |
| 2008/0191522 A1 * | 8/2008 | Maeda et al. .......... 297/216.12 |

FOREIGN PATENT DOCUMENTS

JP    HEI 06-106550    4/1994
JP    HEI 11-019938    1/1999

* cited by examiner

*Primary Examiner*—Kiran B. Patel
(74) *Attorney, Agent, or Firm*—Young Basile

(57) ABSTRACT

Disclosed is a foam-molded member having a skin with which peeling or floating does not occur when the skin is wrapped. Also disclosed is a method of manufacturing the foam-molded member having a skin. A foam-molded member having a skin, such as a door trim, includes a core, a skin, foam and a fixing member. The core can be folded at a folding portion, and the skin faces the core. The foam is filled in a space between the core and the skin. The fixing member fixes the core that is integrally formed with the skin and the foam and is folded at the folding portion. The core is divided into a body portion and an extension portion, with the folding portion serving as a boundary. The extension portion folded at the folding portion is fixed to the body portion by the fixing member.

13 Claims, 38 Drawing Sheets

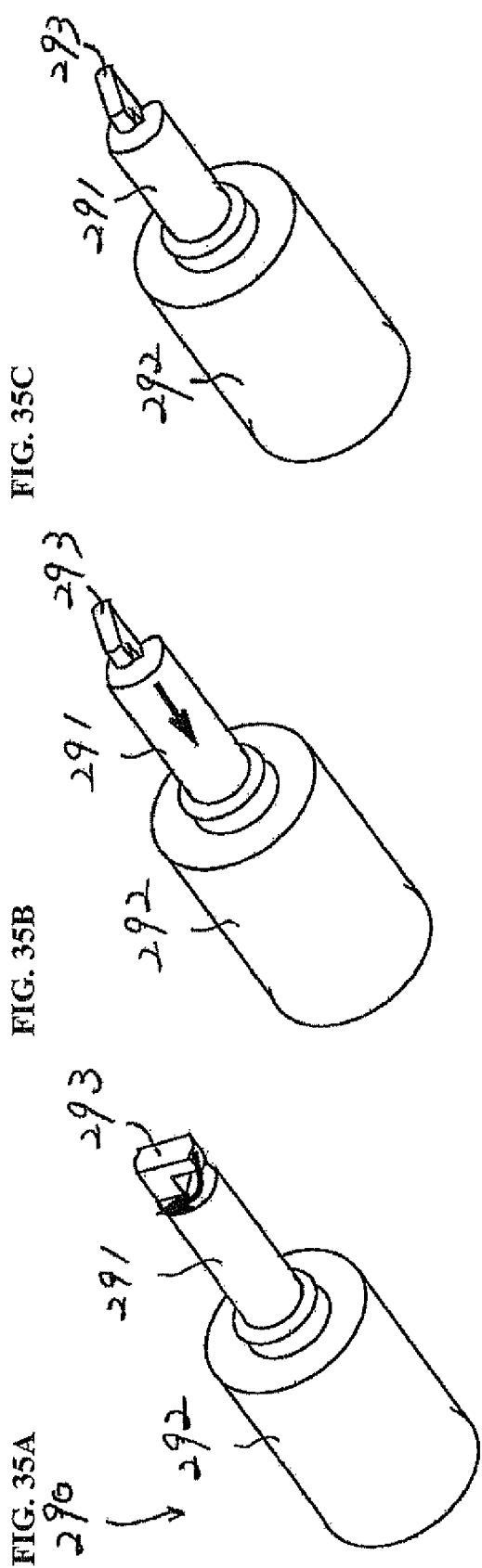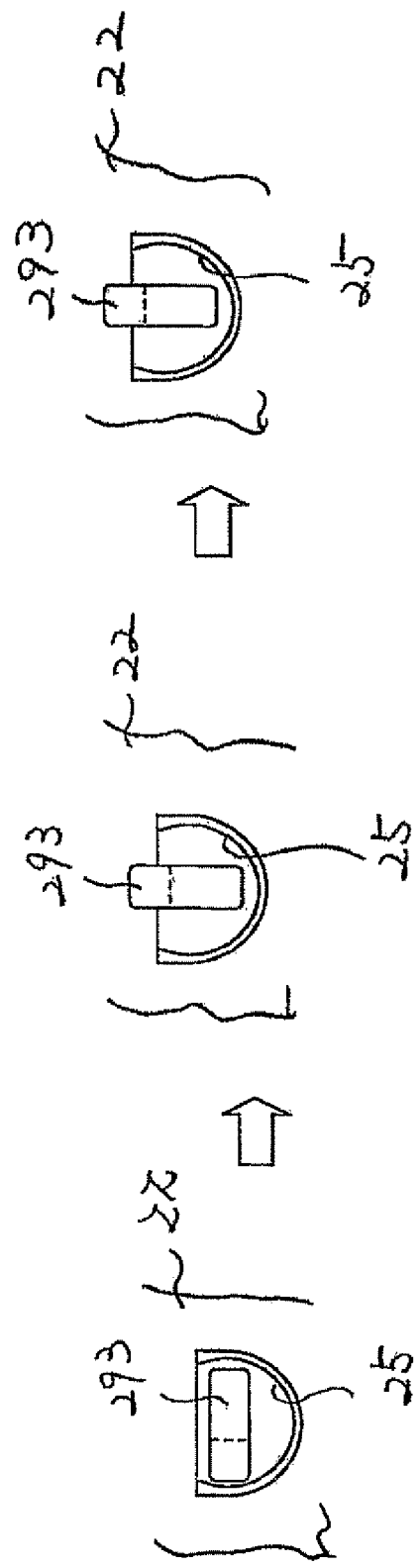
FIG. 35A  FIG. 35B  FIG. 35C

US 7,658,426 B2

FOAM-MOLDED MEMBER HAVING SKIN AND METHOD OF MANUFACTURING FOAM-MOLDED MEMBER HAVING SKIN

CROSS-REFERENCE TO RELATED APPLICATION

This application claims priority from Japanese Patent Application Serial No. 2007-107142, filed Apr. 16, 2007, and No. 2007-334831, filed on Dec. 26, 2007, which are incorporated herein in their entirety by reference.

TECHNICAL FIELD

The present invention relates to a foam-molded member having a skin and to a method of manufacturing a foam-molded member having a skin.

BACKGROUND

Interior parts for use in automobiles or homes are classified into types of a single-layered molded body made of a resin and types of a molded body having a skin. With respect to the latter, in recent years a foam-molded member having a skin that has a three-layered structure including a skin layer, a foam layer, and a core layer has been used (see Japanese Patent Application Laid-Open Nos. 6-106550 and 11-19938). The foam-molded member having a skin is applied to an automobile interior part, for example, a door trim. To improve the appearance of interior parts directly mounted on an inner panel like the door trim, skin wrapping is performed on the back surfaces of an outer circumferential end portion of a product or a waistline portion connected to, for example, an instrument panel.

BRIEF SUMMARY

Disclosed herein is a foam-molded member having a skin and comprising a core. According to one embodiment, the core includes a body portion, an extension portion and a folding portion between the body portion and extension portion. The extension portion is configured to fold at the folding portion into a folded position adjacent the body portion. A skin opposes the core, and a foam is between at least the body portion and the skin. A fixing member is configured to fix the extension portion of the core to the body portion when the extension portion of the core is in the folded position.

Also disclosed are methods of manufacturing a foam-molded member having a skin. One such method comprises disposing a core comprising a body portion, a hinge portion and an extension portion on a core side of a mold and a skin on an opposing skin side of the mold, closing the mold after disposing the core and the skin, filling a space between the core and the skin with a foam to form the foam-molded member, removing the foam-molded member from the mold, folding at least a portion of the extension portion around the hinge portion and fixing the folded extension portion to the body portion with a fixing member, wherein the skin forms a surface.

BRIEF DESCRIPTION OF THE DRAWINGS

The description herein makes reference to the accompanying drawings wherein like reference numerals refer to like parts throughout the several views, and wherein:

FIGS. 35A to 35C are views used to describe the operation of the pulling unit of FIG. 34;

DETAILED DESCRIPTION OF EMBODIMENTS OF THE INVENTION

Figure 1:
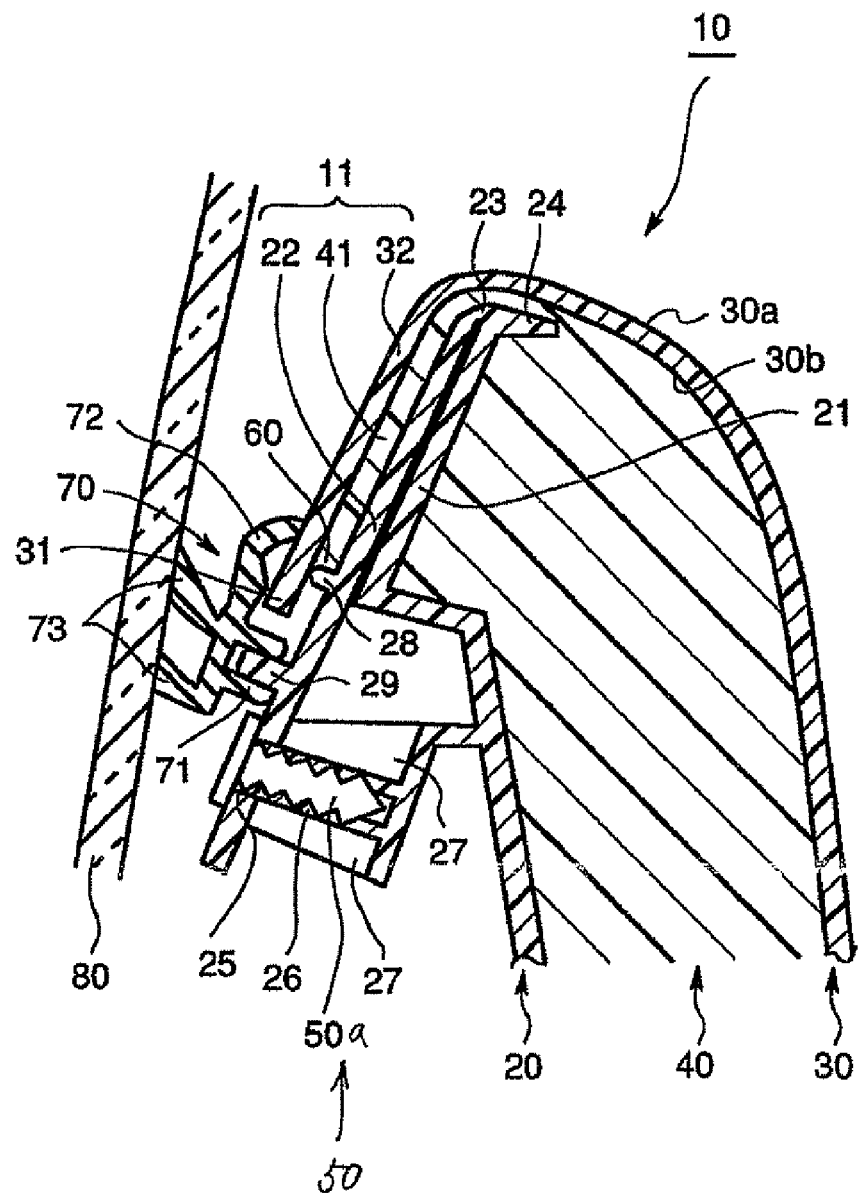
FIG. 1 is a cross-sectional view showing a main portion of a door trim to which a foam-molded member having a skin according to a first embodiment of the invention is applied, together with a window and a door weatherstrip.

In known methods, a process for cutting a skin that is formed to have a predetermined size in a wrapping shape, and a process for bonding the wrapping skin to a core with an adhesive are performed during the skin wrapping. For this reason, it is not possible to easily and quickly manufacture a foam-molded member having a skin. In particular, if the amount of adhesive to be applied is not sufficient or drying is not sufficiently performed, peeling or floating of the wrapped skin can occur.

According to certain embodiments of the invention taught herein, the extension portion of the core integrated into the skin is folded at the folding portion so that the skin forms a surface and is fixed by the fixing member. Thus, a bonding process may not be performed, and it is possible to prevent occurrences of peeling or floating of the wrapping skin that is caused by an adhesive. Further, the extension portion of the core integrated into the skin is folded at the folding portion so that the skin forms a surface. Since the skin is stretched at a waistline portion, it is possible to improve appearance quality.

These and other features of the invention are described herein with reference to the drawing figures.

Referring to FIG. 1, the door trim 10 is a foam-molded member having a skin and includes a core 20, a skin 30, foam 40 and a fixing member 50. The core 20 can be folded at a folding portion 23, and the skin 30 faces the core 20. The foam 40 is filled in a space between the core 20 and the skin 30. The fixing member 50 fixes the core 20 that is integrally formed with the skin 30 and the foam 40 in the folded position at the folding portion 23. The core 20 of this embodiment is divided into a body portion 21 and an extension portion 22 with the folding portion 23 serving as a boundary. The extension portion 22 folded at the folding portion 23 is fixed to the body portion 21 by the fixing member 50. The skin 30 forms the surface of the automobile interior part.

The folding portion 23 is composed of a hinge portion that is thinner than other portions of the core 20. Before the core 20 is folded, the body portion 21 and the extension portion 22 form an angle of about 90° in the vicinity of the hinge portion 23, as seen and described below with reference to FIGS. 2, 3 and 4. A flange face 24, which defines the appearance of the tip of the door trim 10, is provided at the body portion 21.

A through hole 25 is formed in the extension portion 22 of the core 20. A fixing boss 26, which is to be inserted into the through hole 25, is formed on the body portion 21 of the core 20. Until the fixing boss 26 of the body portion 21 is inserted into the through hole 25 of the extension portion 22, the extension portion 22 is folded back. The fixing boss 26 is reinforced by a plurality of ribs 27 integrally formed with the fixing boss.

A fastener suitable to fix the folded extension portion 22 to the body portion 21 may be used as the fixing member 50. In the illustrated embodiment, a bolt 50a is fastened to the fixing boss 26 through the through hole 25 of the extension portion 22 so that the folded extension portion 22 is fixed to the body portion 21.

The extension portion 22 of the core 20 includes a rib portion 28 between the skin 30 and the extension portion 22, forming a seal portion 60 for preventing the foam 40 from leaking. More specifically, the rib portion 28 protrudes toward the back surface 30b of the skin 30 at a position that corresponds to the vicinity of an end portion 31 of the skin 30. When the foam 40 is filled, the end of the rib portion 28 comes in close contact with and interferes with the back surface 30b of the skin 30, so that the seal portion 60 is formed. As a result, the leakage of the foam 40 is prevented.

The seal portion 60 can freely discharge gas caused by filling of the foam 40. If the gas is discharged, gas collection does not occur between the skin 30 and the extension portion 22 and filling of the foam 40 will not be prevented. In order to allow the gas to be freely discharged, a part of the rib portion 28 is cut, and a seal tape such as a flexible urethane tape may then be attached to the cut portion of the rib portion 28. Due to the seal portion 60, it is possible to discharge gas and to allow the foam 40 to fill without the mold being required to be slightly opened to discharge gas. Gas leakage can also be prevented with the seal portion 60.

A flange 29 is formed on the extension portion 22 of the core 20, and a part 70 is mounted on the flange 29. The extension portion 22 of the core 20 extends so as to be longer than the end portion 31 of the skin 30. The flange 29 protrudes from the extension portion 22 in a region where the skin 30 does not exist, that is, a region between the end portion 31 of the skin 30 and the end of the extension portion 22. The flange 29 is provided so as to be relatively close to the end portion 31 of the skin 30. The end portion 31 of the skin 30 is covered with the part 70 mounted on the flange 29.

A door weatherstrip is used to exemplify the part 70 in this embodiment. The door weatherstrip 70 includes a mounting portion 71 mounted on the flange 29, a seal lip 72 in contact with the door trim 10 and seal lips 73 in contact with the inner surface of the window 80. The end of the seal lip 72 contacts with the skin 30 just above the end portion 31 of the skin 30, so that the end portion 31 of the skin 30 is covered with the part.

According to a conventional method where the wrapping skin is bonded to the core the end of the core, that is, a portion where the skin begins to wrap, is positioned where it is easily seen. Accordingly, the leakage of the foam should be prevented so that the appearance or quality does not deteriorate. However, it is not possible to sufficiently prevent the leakage of the foam with the conventional method. Further, there is a concern that the foam leaks to and is attached to the back surface of the skin, that is, the surface of the skin bonded to the core. As a result, when the skin wraps and is bonded to the core, a concave-convex shape is formed on the surface of the skin at a position that is easily seen, deteriorating the appearance. Finally, a large amount of foam leaking can result in inferior goods.

In contrast, according this embodiment, the rib portion 28 comes in close contact with and interferes with the skin 30, so that the seal portion 60 is formed. Therefore, it is possible to sufficiently prevent leakage of the foam 40 from the end portion 31 of the skin 30. In addition, since the end portion 31 of the skin 30 is stretched on the extension portion 22 of the core 20, the end portion 31 of the skin 30 and the seal portion 60 are in positions difficult to see. For this reason, even if some foam 40 leaks from the end portion 31 of the skin 30, the leakage of the foam 40 is difficult to see so that the appearance quality of the product does not deteriorate. If the rib portion 28 comes in contact with the skin 30 by a strong force in order to improve a sealing performance, a concave-convex shape is formed on the surface 30a of the skin 30 due to the strong contact. However, even in this case the concave-convex shape is difficult to see. The seal lip 72 of the door weatherstrip 70 and the end portion 31 of the skin 30 overlap each other so that the end portion 31 is covered with the door weatherstrip 70. Accordingly, it is possible to hide the leakage of foam 40 and the concave-convex shape of the skin 30, resulting in better appearance quality.

Each of the skin 30, the core 20 and the foam 40 may be made of materials appropriately selected from materials known in the art. For example, a vinyl chloride resin (PVC), an olefinic thermoplastic elastomer (TPO), a polyurethane thermoplastic elastomer (TPU), or the like may be used as the material of the skin 30. The skin 30 is formed in a predetermined shape by vacuum molding. A polypropylene resin (PP), an acrylonitrile butadiene styrene resin (ABS), or the like may be used as the material of the core 20. For example, urethane foam may be used as the foam 40.

A method of manufacturing the door trim 10 is described below.

Figure 2:
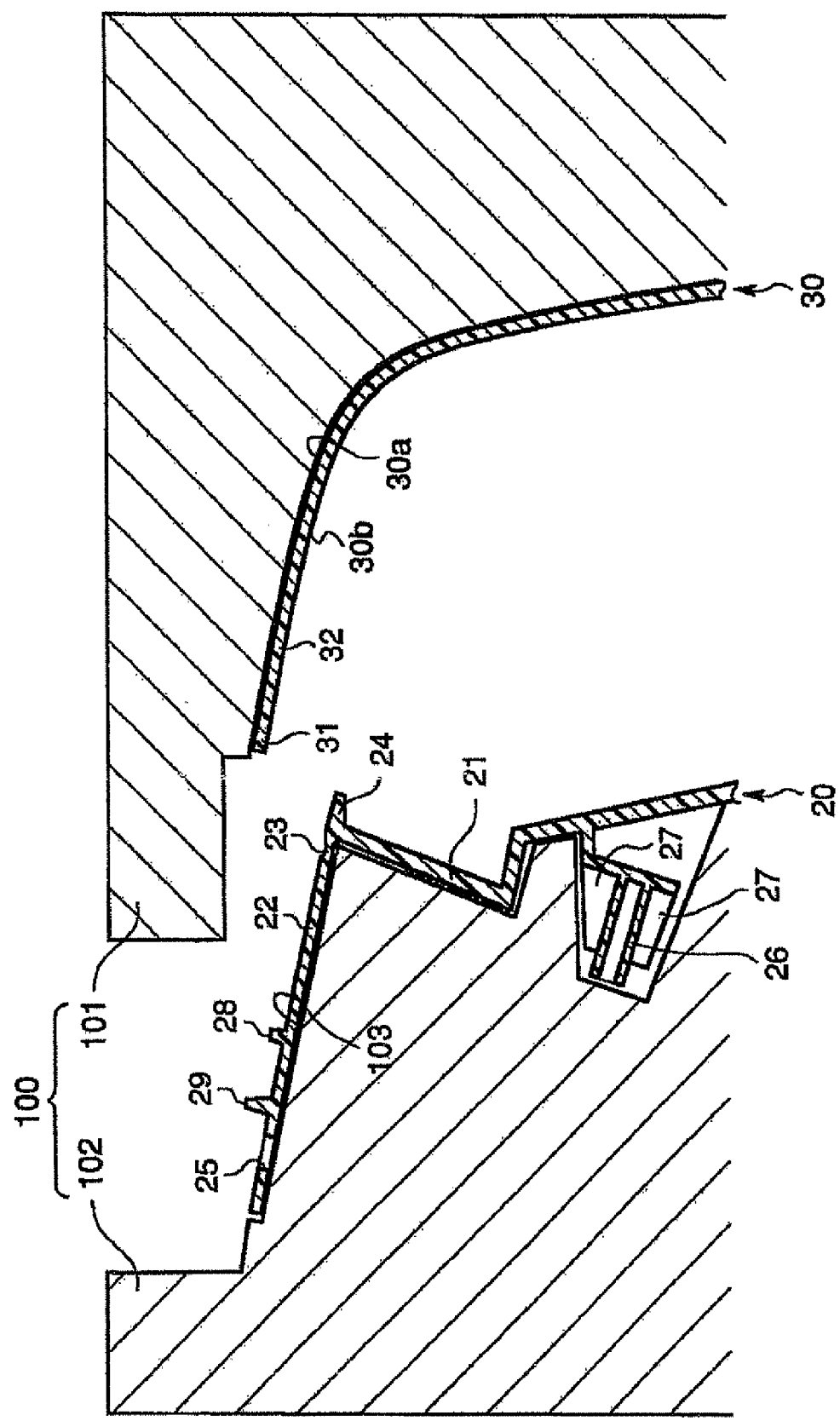
FIG. 2 is a cross-sectional view showing the skin and a core of FIG. 1 disposed in an open mold.

Referring to FIG. 2, a mold 100 for manufacturing the first embodiment includes a cavity mold 101 and a core mold 102 that can approach each other and be separated from each other. As illustrated, the cavity mold 101 approaches and is separated from the core mold 102. A cavity having an inner shape that corresponds to the outer shape of the skin 30 is formed in the cavity mold 101. While the core is stretched before the body portion 21 and the extension portion 22 are folded to each other, the core 20 is disposed on the core mold 102. The extension portion 22 is set on an extension portion 103 of the core mold 102. The body portion 21 and the extension portion 22 form an angle of about 90°.

First, the cavity mold 101 and the core mold 102 of the mold 100 are opened as shown in FIG. 2, and the stretched core is disposed on the core mold 102. Then, the skin 30 is disposed on the cavity mold 101 in a disposition process. The skin 30 is disposed so as to face the core 20.

Figure 3:
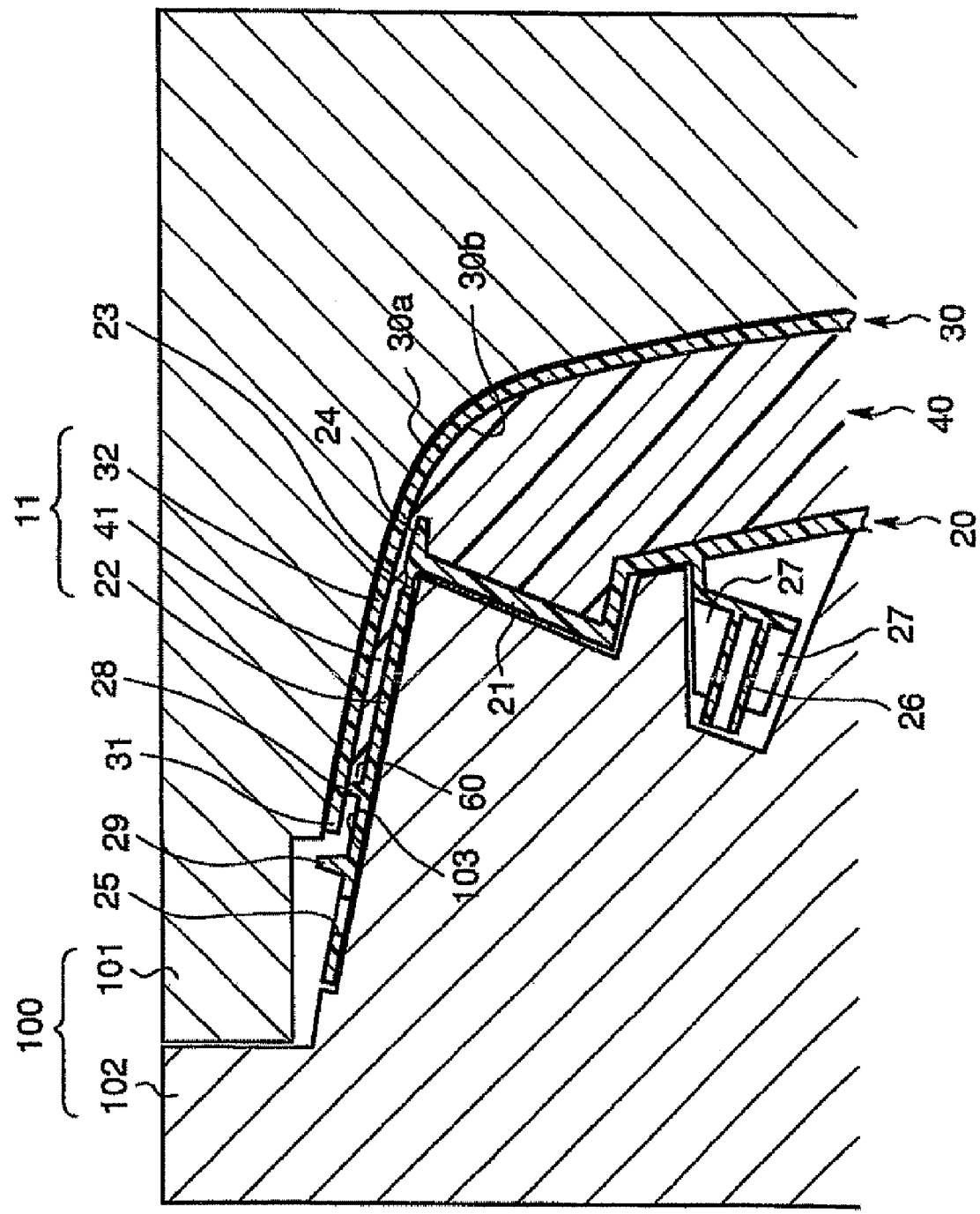
FIG. 3 is a cross-sectional view illustrating a process of filling foam while the mold of FIG. 2 is closed.

Subsequently, the mold 100 is closed as shown in FIG. 3, and the end of the rib portion 28 is allowed to come in contact with and to interfere with the back surface 30b of the skin 30 so that the seal portion 60 is formed. The skin 30 faces the body portion 21 and the extension portion 22 of the core 20. In a filling process, a predetermined amount of foam 40 is filled in the space between the core 20 and the skin 30. The space includes a space formed between the skin 30 and the body portion 21 and a space formed between the skin 30 and the extension portion 22. Since both spaces communicate with each other, a foam layer is formed in both spaces.

Figure 4:
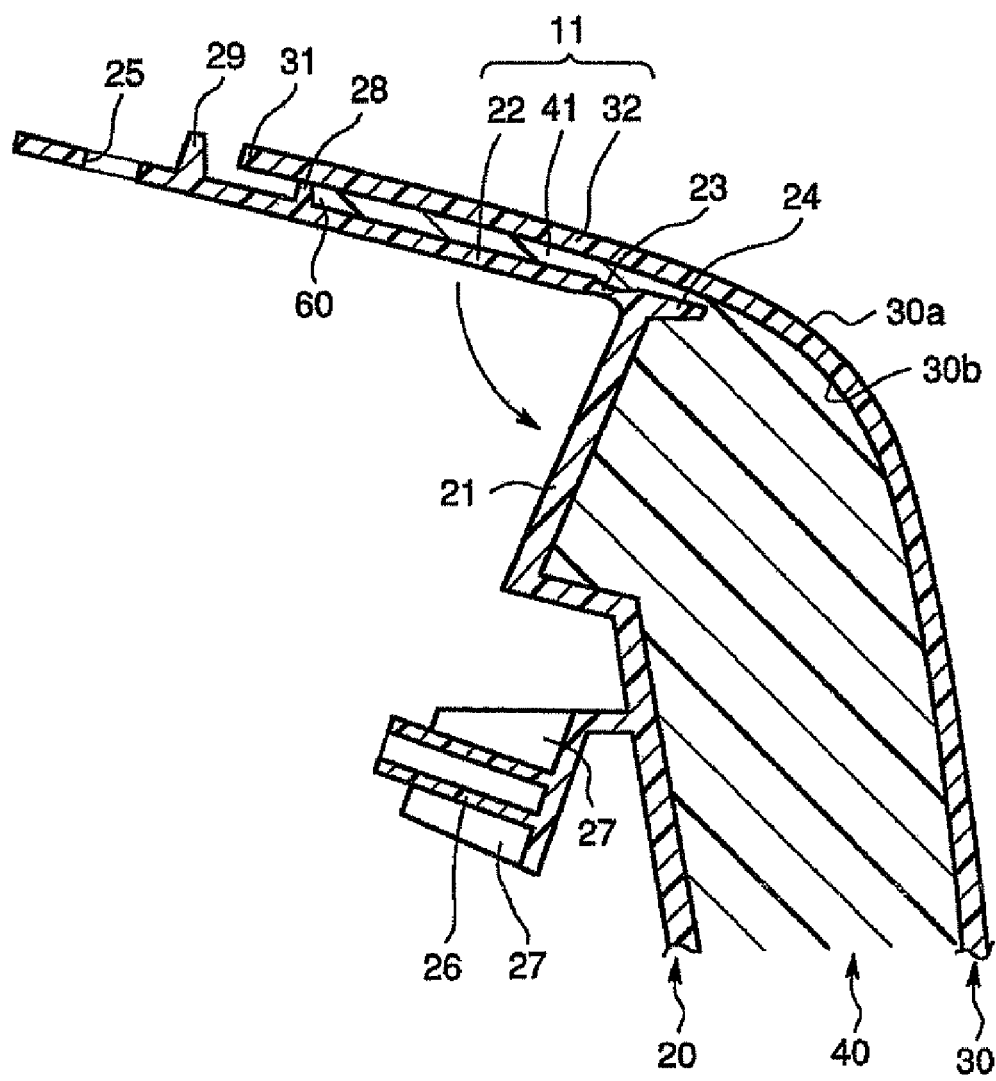
FIG. 4 is a cross-sectional view showing the core integrated into the skin and the foam taken out from the mold of FIG. 2.

Next, the mold 100 is opened as shown in FIG. 4, and the core 20 that is integrated with the skin 30 and the foam 40 is taken out from the mold 100. The extension portion 22 of the core 20, an extension portion 32 of the skin 30 facing the extension portion 22, and an extension portion 41 of the foam layer form an extension portion 11 of the molded body. Since the extension portion 11 of the molded body is a foam-molded body having a skin peeling of the skin can be avoided, unlike where the wrapping skin is bonded to the core by an adhesive.

Figure 5:
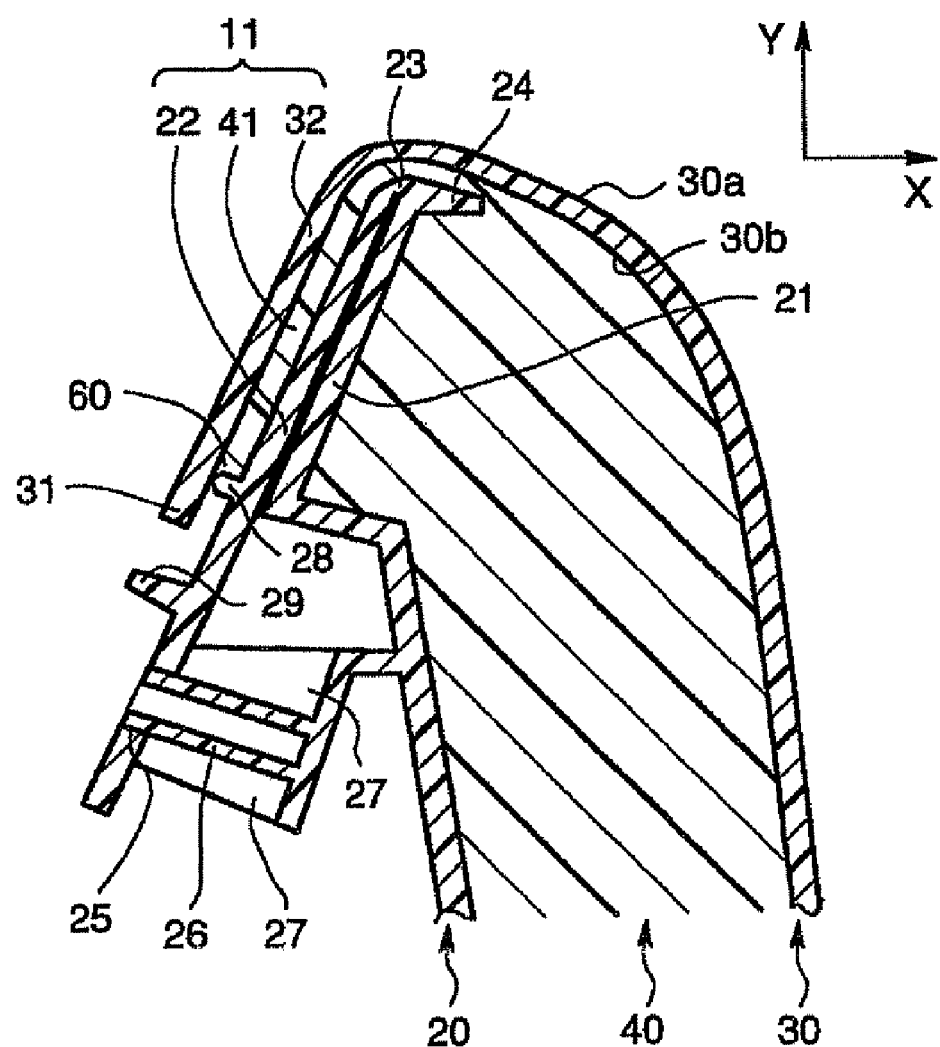
FIG. 5 is a cross-sectional view showing an extension portion of the core of FIG. 4 folded at a folding portion.

The extension portion 22 of the core 20 is folded to the body portion 21 at the hinge portion 23 in the direction of the arrow in FIG. 4. In this case, the extension portion 22 is integrated with the skin 30 and the foam 40 and forms the extension portion 11 of the molded body. As shown in FIG. 5, the fixing boss 26 of the body portion 21 is inserted into the through hole 25 of the extension portion 22. The surface of the extension portion 11 near the through hole 25 bumps against the contact faces of the ribs 27 formed in the vicinity of the fixing boss 26 so that the folded-back extension portion 11 of the molded body is positioned in an X-direction (width direction) shown in FIG. 5. The relationship between the through hole 25 and the fixing boss 26 positions the folded-back extension portion in a Y-direction (height direction) and a longitudinal direction perpendicular to the plane of FIG. 5.

Figure 6:
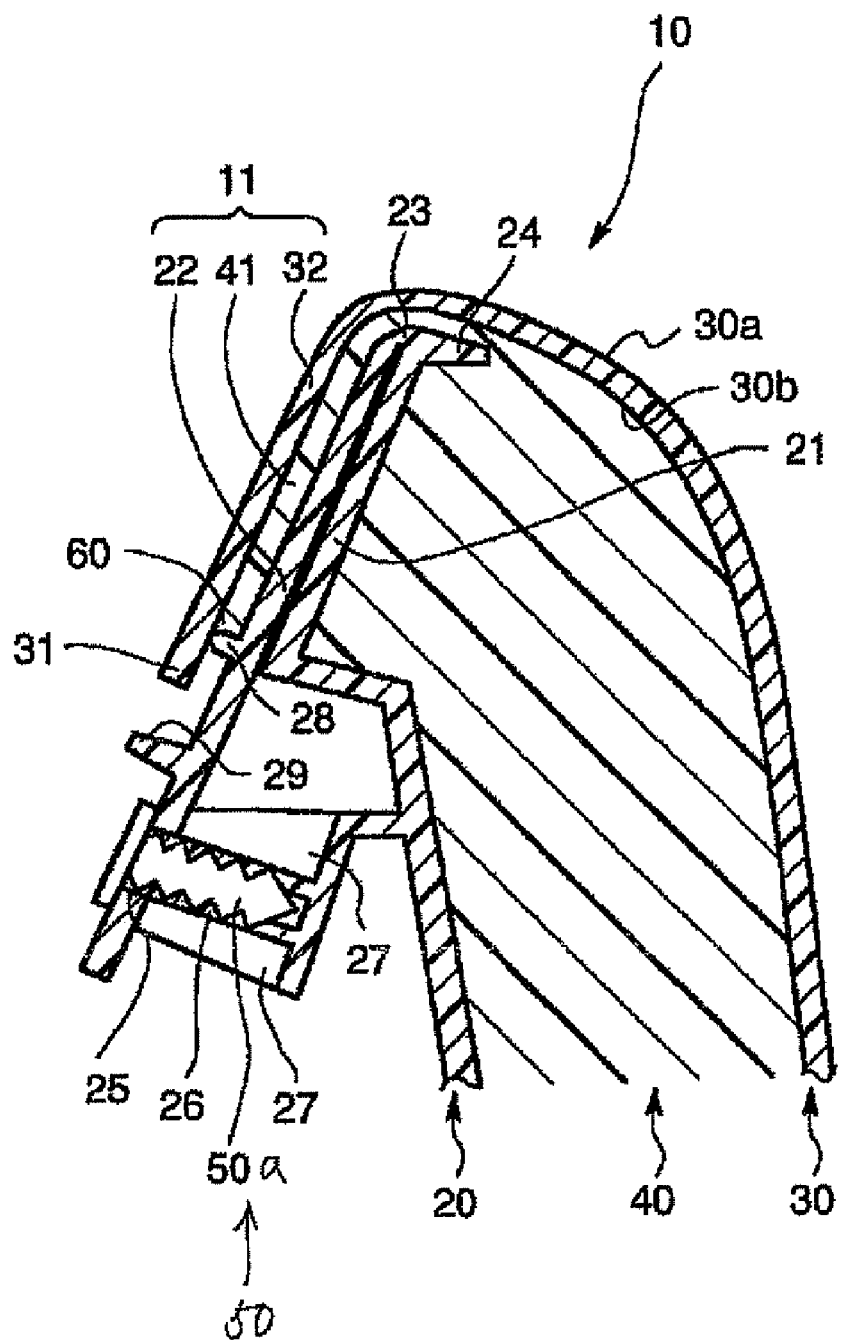
FIG. 6 is a cross-sectional view showing the folded extension portion of the core of FIG. 5 fixed to the body portion by a fixing member.

As shown in FIG. 6, the bolt 50a is fastened to the fixing boss 26 through the through hole 25 of the extension portion 22. Accordingly, the folded extension portion 22 of the core 20 is fixed to the body portion 21 through the through hole 25 of the extension portion 22, completing the fixing process.

When the extension portion 11 of the molded body is folded back and fixed in this way, the extension portion 22 and the body portion 21 of the core 20 come in contact with each other. When the molded door trim 10 is mounted on an automobile, it is thought that rubbing noise or abnormal noise is generated from the mounting portions thereof due to vibration during driving. In this case, a thin nonwoven tape may be previously attached to a portion between the extension portion 22 and the body portion 21, which are superposed on each other, so that it is possible to prevent rubbing noise or the like from being generated.

Returning now to FIG. 1, the door weatherstrip 70 is mounted on the flange 29 of the extension portion 22. The seal lip 72 of the door weatherstrip 70 and the end portion 31 of the skin 30 overlap each other so that the end portion 31 is covered with the door weatherstrip 70. Even if foam 40 leaks or the concave-convex shape discussed previously is formed at the end portion 31, the leakage of the foam and the concave-convex shape can be hidden. Therefore, the appearance quality of the product does not deteriorate. When the extension portion 22 of the core 20 is folded to the body portion 21, the skin 30 is stretched, further improving the appearance and appearance quality of the door trim 10.

According to the embodiment of the invention disclosed above, a process of cutting the skin in a wrapping shape and bonding the wrapping skin to the core with adhesive does not need to be performed, making the manufacture of the door trim 10 quick and easy. Further, since an adhesive is not used in the method, it is possible to prevent peeling or floating of the wrapping skin, which is caused by insufficient adhesive or insufficient drying.

By eliminating skin cutting man-hours and skin wrapping man-hours, manufacturing costs are reduced. In the case of a manufacturing method where the wrapping skin is bonded to the core by an adhesive, polypropylene resin (PP) is not suitable for use as the core because there is no polarity, requiring modification of the surface of the core. A primer treatment or a flame treatment is performed to modify the surface. Therefore, the disclosed method further reduces costs because no adhesive need be used, so the surface of the core does not need to be modified when polypropylene resin (PP) is used. Since the flange 29 on which the door weatherstrip 70 is mounted is formed on the extension portion 22 of the core 20, a separate and independent part exclusively used to mount the door weatherstrip 70 is unnecessary, again reducing the costs of manufacturing.

The extension portion 22 of the core has been integrated into the skin 30 and the foam 40 in this embodiment, but the invention is not limited thereto. If being integrated into the skin 30, the extension portion of the core may not be integrated into the foam 40. Further, a hinge portion has been provided as the folding portion 23 in this embodiment. However, as long as the body portion 21 and the extension portion 22 of the core 20 are freely folded to each other, the folding portion 23 can be appropriately changed. For example, if the folding portion can be easily folded to itself and does not fracture when being folded, it is possible to produce the same foam-molded member 10 having a skin as that according to the above-mentioned embodiment. Furthermore, a two-fold core 20 has been exemplified, but a core of which three or more portions are freely folded to one another may be used.

In addition, the extension portion 22 of the core 20 is fixed to the body portion 21 by the fixing member 50. However, it is only necessary to fix the core 20, which is integrated into the skin 30 and the foam 40 and folded at the folding portion 23, by the fixing member 50. The core 20 may be fixed to a member different from the core 20 by the fixing member 50.

The fixing member is also not limited to the bolt 50a of the illustrated embodiment. As long as the folded core can be fixed, appropriate methods or members may be applied. Further, fixing by fitting, fixing by caulking, fixing by heat welding, and the like may be applied.

A second embodiment of the invention taught herein is next described with reference to FIGS. 7-16. Elements common to the elements shown in FIGS. 1 to 6 are indicated by the same reference numerals, and the description thereof is partially omitted. The second embodiment is different from the first embodiment in that the fixing member 50 further includes a pair of fitting members 201 that fixes the core 20.

Figure 7:
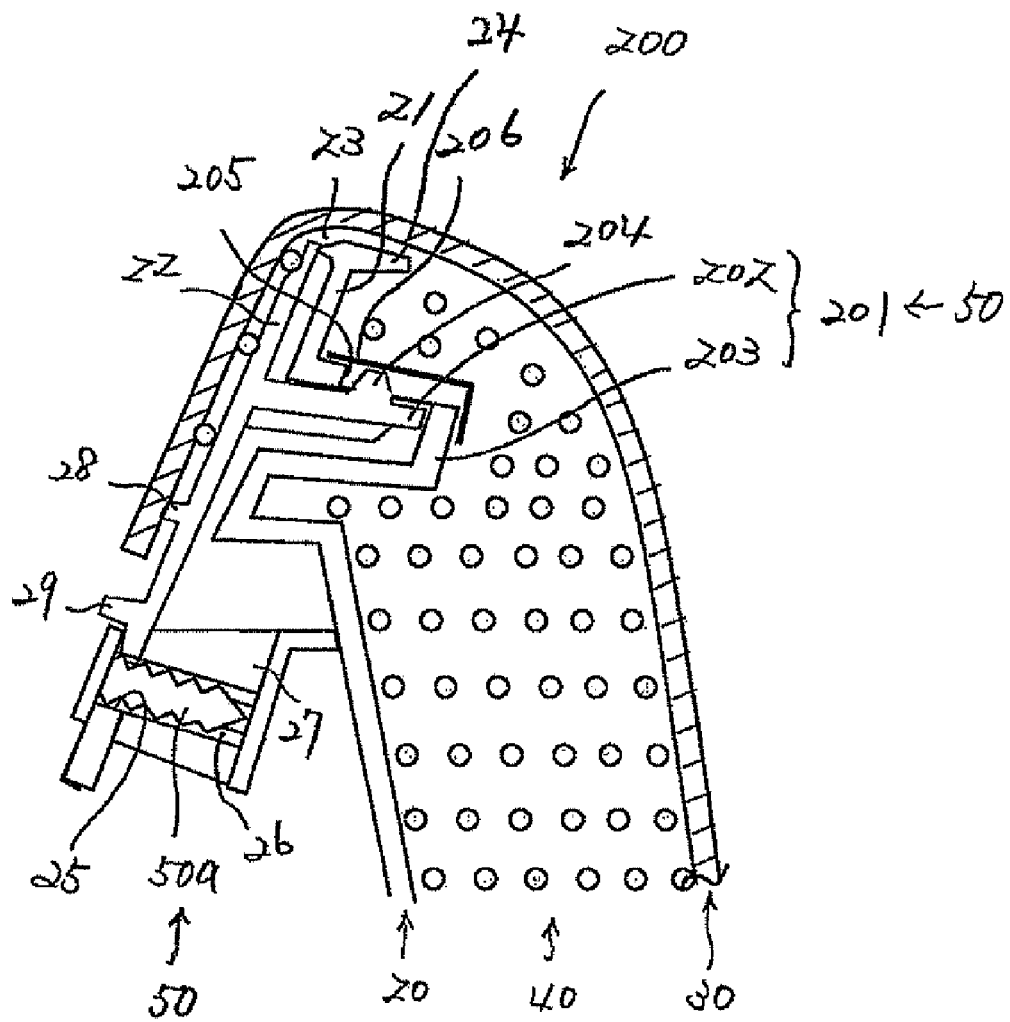
FIG. 7 is a cross-sectional view showing a main portion of a door trim to which a foam-molded member having a skin according to a second embodiment of the invention is applied, and showing a folded extension portion of a core fixed to a body portion by a fixing member.

Referring first to FIG. 7, the door trim 200 includes the pair of fitting members 201 as the fixing member 50 in addition to the bolt 50a. The pair of fitting members 201 includes one fitting member formed as a fitting protrusion 202 formed on the extension portion 22 of the core 20 and a second fitting member formed as a fitting recess 203 formed on the body portion 21 of the core 20. The fitting recess 203 is sized to fixedly retain the fitting protrusion 202. When the fitting protrusion 202 is fitted into the fitting recess 203, the folded extension portion 22 is fixed to the body portion 21. In addition, the bolt 50a is fastened to the fixing boss 26 so that the folded extension portion 22 is fixed to the body portion 21.

Figure 8:
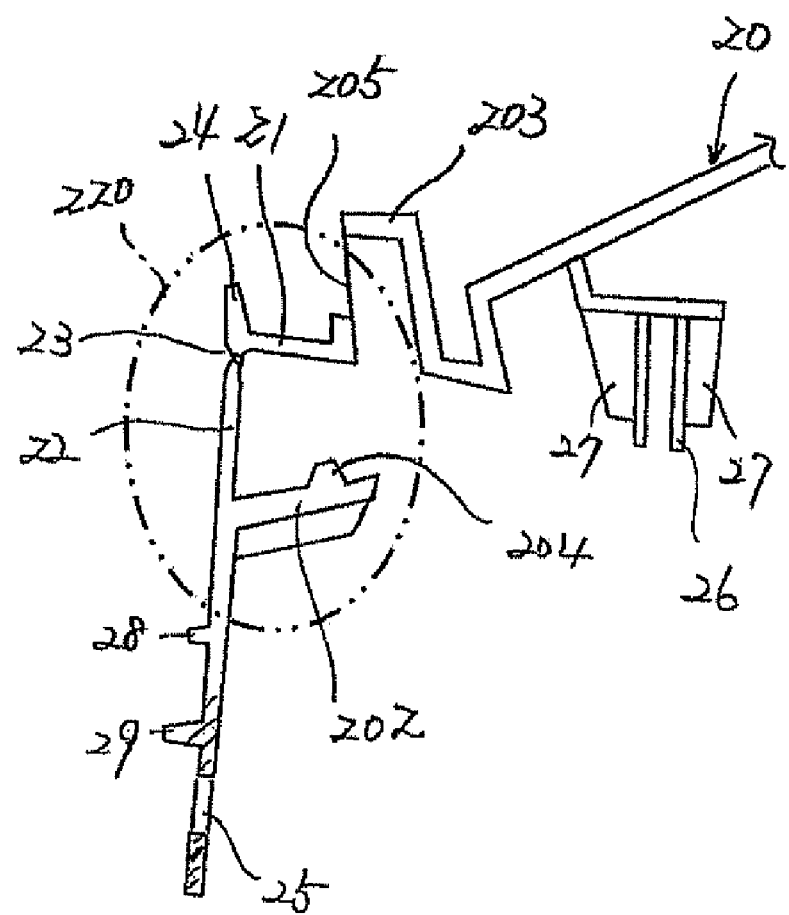
FIG. 8 is a cross-sectional view of the core of FIG. 7.

Referring to FIG. 8, the claw member 204, which can be engaged with and disengaged from the fitting recess 203, is formed at the end of the fitting protrusion 202. A window 205 with which the claw member 204 is engaged is formed at the fitting recess 203. A seal tape 206, which closes the window 205 (shown in FIG. 7), is bonded to the side of the fitting recess opposite to the side of the window 205 where the claw member 204 is inserted. The seal tape 206 prevents the filled foam 40 from entering the window 205.

Figure 9:
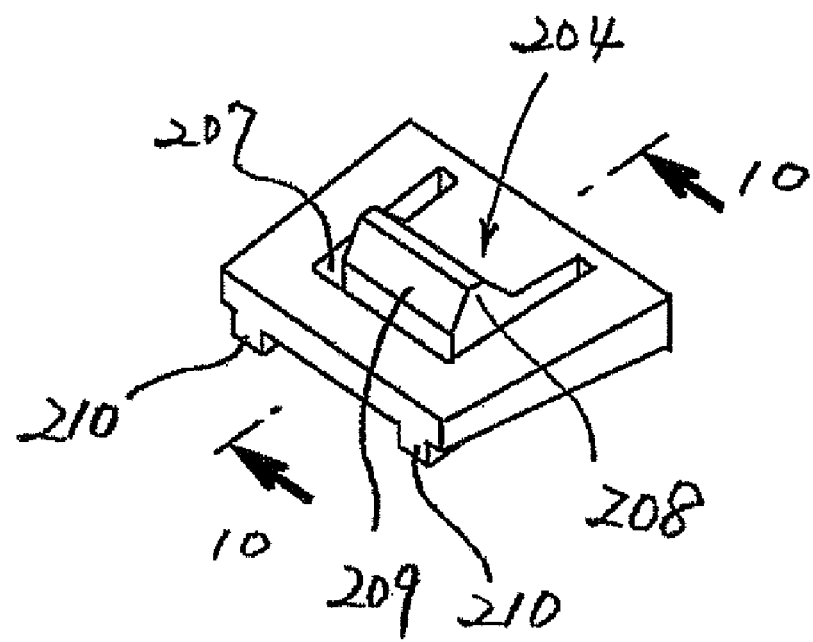
FIG. 9 is a perspective view of a claw member of FIG. 7.

Referring to FIG. 9, a slit 207 is formed at three sides of the claw member 204. The fitting protrusion 202 supports the claw member 204 like a cantilever and allows the claw member 204 to be elastically bent. A stopper 208, which is caught by an inner wall of the window 205, protrudes from the claw member 204. A guide surface 209 is formed in a tapered shape at the end of the stopper 208 and guides the stopper 208 to be inserted into the fitting recess 203. Ribs 210, which form a space in which the claw member 204 is bent, are formed on the surface of the fitting protrusion opposite to the surface from which the stopper 208 protrudes.

Figure 10A:
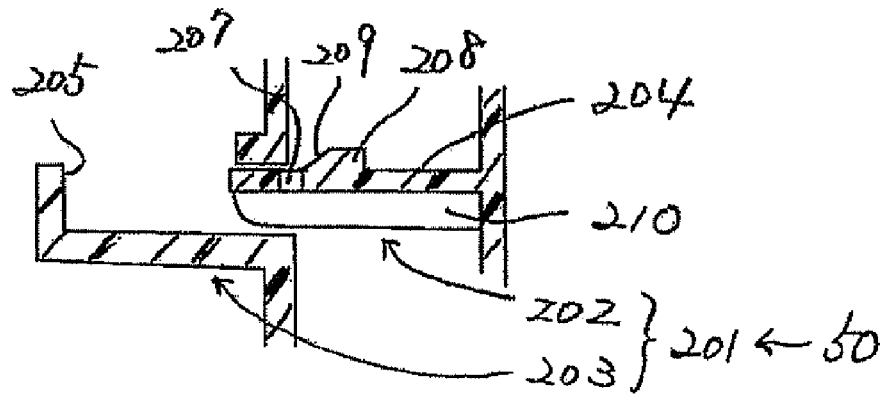
FIGS. 10A to 10D are cross-sectional views that illustrate the operation of the claw member and are taken along a line 10-10 of FIG. 9.
Figure 10B:
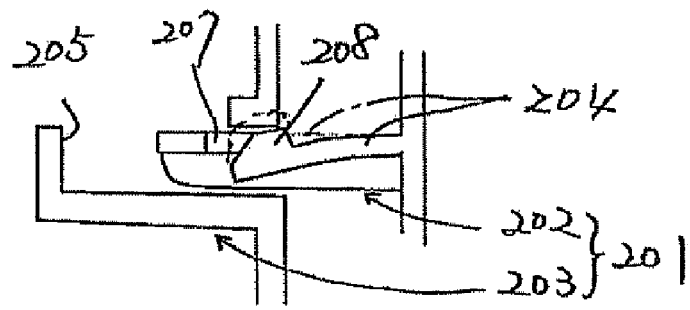
Figure 10C:
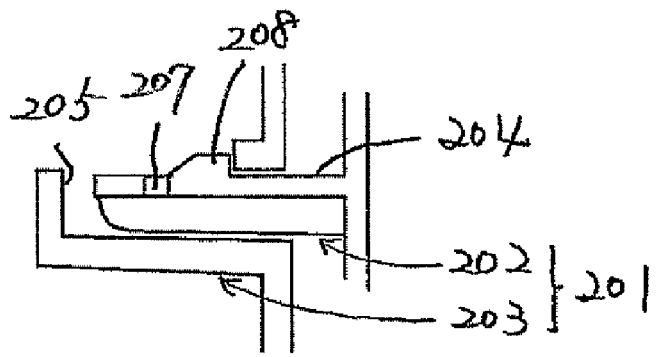
Figure 10D:
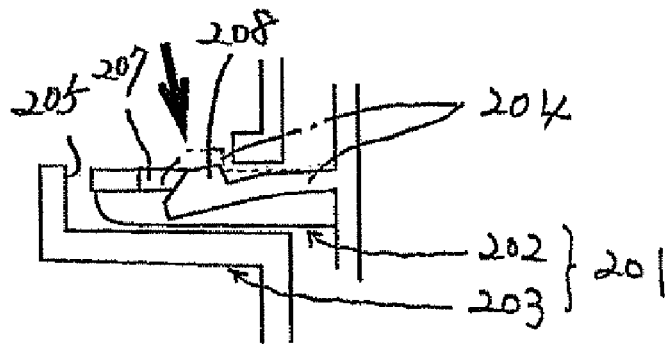

When the extension portion 22 is folded to the body portion 21 at the hinge portion 23, the claw member 204 of the fitting protrusion 202 is inserted into the fitting recess 203 while being guided by the guide surface 209 of the stopper 208 as shown in FIG. 10A. When the extension portion 22 is further folded, the claw member 204 is further inserted into the fitting recess 203 while being elastically bent downward as shown in FIG. 10B. When the stopper 208 reaches the window 205, the claw member 204 elastically returns to the initial state as shown in FIG. 10C, and the stopper 208 is caught by the inner wall of the window 205. Accordingly, the claw member 204 is engaged with the fitting recess 203, and the extension portion 22 is fixed to the body portion 21. Meanwhile, when the extension portion 22 is disengaged from the body portion 21, the stopper 208 of the claw member 204 is pushed downward as shown in FIG. 10D, and the stopper 208 is separated from the window 205. Accordingly, the claw member 204 is disengaged from the fitting recess 203, and the mold can be opened so that the extension portion 22 and the body portion 21 are separated from each other.

The process of manufacturing the door trim 200 includes a cutting process of cutting the end portion of the extension portion, which is close to the end in comparison with the fixing member 50, after this fixing process in addition to the manufacture process according to the first embodiment.

Figure 11:
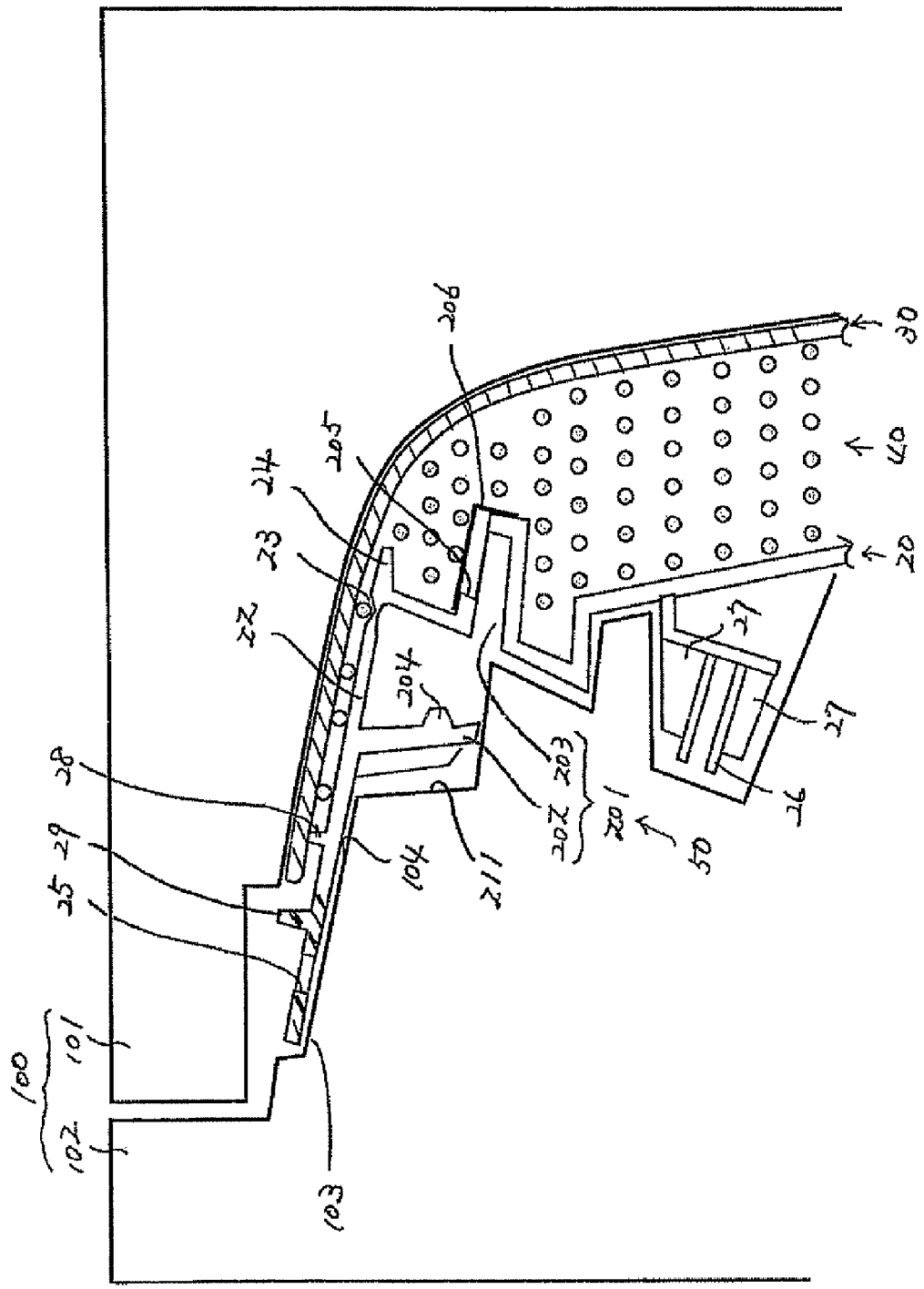
FIG. 11 is a cross-sectional view illustrating a process in which a mold for the second embodiment is closed and foam is filled.

Referring to FIG. 11, while the extension portion 22 and the body portion 21 form an angle of about 90°, the core 20 is mounted on the mounting surface 104 of the extension portion 103 of the core mold 102 during the disposition process. A dent 211 is formed on the core mold 102 so that the fitting protrusion 202 does not interfere with the core mold 102. Further, as described above, seal tape 206 is bonded to the window 205 of the fitting recess 203 in order to prevent the filled foam 40 from entering the window 205 during the filling process.

Figures 12A, 12B:
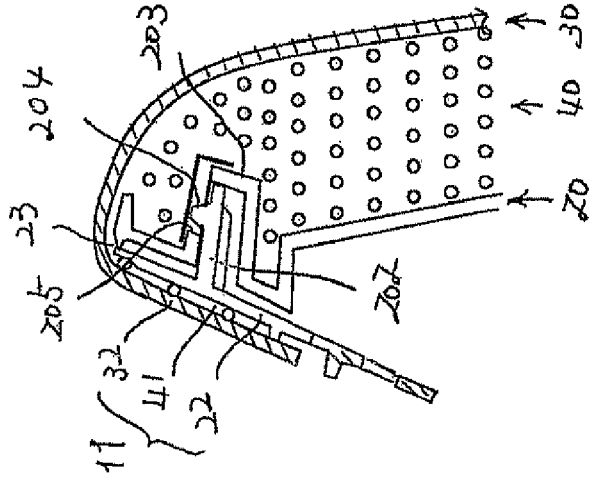
FIG. 12A is a cross-sectional view showing a main portion when the core integrated into a skin and the foam is taken out from the mold of FIG. 11.
FIG. 12B is a cross-sectional view showing the main portion of FIG. 12A when an extension portion of the core is folded at a folding portion.
Figure 12C:
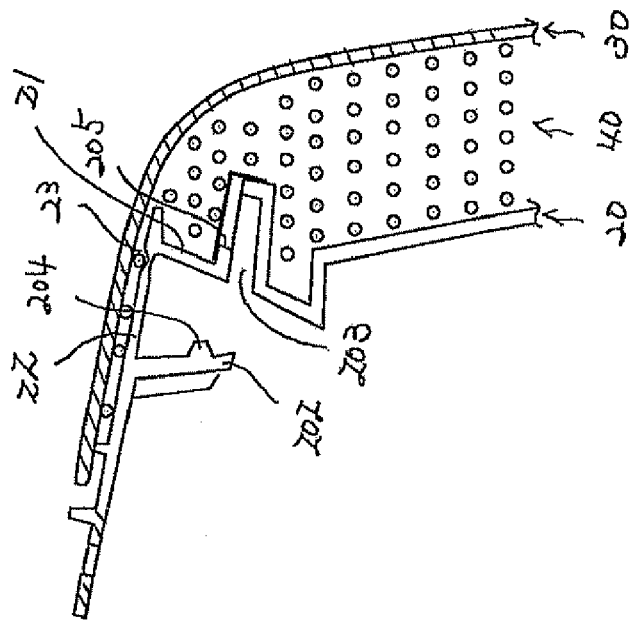
FIG. 12C is a cross-sectional view showing the main portion of FIG. 12B when the extension portion is fixed to the body portion and an end portion of an extension portion of a molded body is then cut and removed.

Referring to FIG. 12A, the mold 100 is opened, and the core 20 integrated with the skin 30 and the foam 40 is taken out from the mold 100. Referring to FIG. 12B, the extension portion 22 is folded to the body portion 21 at the hinge portion 23. The claw member 204 of the fitting protrusion 202 engages with the fitting recess 203 so that the extension portion 22 is fixed to the body portion 21 during the fixing process. FIGS. 12A-12C show the cross-section of a portion where the fixing boss 26 is not formed. In the cross-section of the portion where the fixing boss 26 is formed, as shown in FIG. 7, the bolt 50a is fastened to the fixing boss 26 so that the extension portion 22 is fixed to the body portion 21 as well in the fixing process.

Referring to FIG. 12C, the end portion of the extension portion 11 of the molded body, which is close to the end in comparison with the pair of fitting members 201, is cut and removed in the cutting process. It is possible to prevent the interference with other parts by removing an unnecessary portion. Since the end portion of the extension portion, which is close to the end in comparison with the pair of fitting members 201, is cut, the fixing member 50 continues to fix the extension portion 22 to the body portion 21. Therefore, a fixing failure such as floating does not occur at the remaining extension portion 11 of the molded body. As illustrated, a part of the skin 30 is also cut and removed as well as a part of the extension portion 22 of the core 20. The removed cutting piece 212 includes the rib portion 28. However, since the filling process has been finished, there is no problem even though the rib portion is removed.

The end portion of the extension portion 11 may be cut in other locations below the fitting members 201. Further, the entire skin 30 may remain with only the extension portion 22 being cut and removed. Even when only one kind of fixing member 50 is used, as in the first embodiment, the cutting process may be added to remove any excess extension portion.

Due to the formative design of the door trim 200 or the restriction on the layout when the door trim 200 is disposed in a vehicle cabin, a folding length La (see FIG. 12C) of the door trim required for the final product is not constant or is partially shortened in a direction perpendicular to the plane of the drawing, that is, in the longitudinal direction of a vehicle. For example, the folding length La is relatively long at the front portion of the vehicle and is relatively short at the rear portion of the vehicle. In this case, if the length of the extension portion 22 of the core 20 is determined so as to correspond to the folding length La that is finally required, the area of the extension portion 22 is decreased so that the weight of the extension portion is decreased. Meanwhile, the folded hinge portion 23 has an elastic force to return to the stretched shape before the folding. For this reason, the extension portion 22 does not come in close contact with the mounting surface 104 of the core mold 102 and is separated from the mounting surface 104 so as to float toward the skin 30. In this state, if the mold 100 is closed the extension portion 22 interferes with the skin 30, and the skin 30 is deviated. This causes wrinkling or breaking concerns of the skin such that the foam 40 leaks or is not sufficiently filled.

If the cutting process is added like in the second embodiment, it is possible to obtain an advantage of sufficiently ensuring the area of the extension portion 22 fixed to the core mold 102 even though the folding length La that is finally required is shortened. Accordingly, while meeting the demand for the restriction on the layout or the formative design, it is possible to prevent the skin 30 from being deviated, to prevent the foam 40 from leaking, and to prevent the foam 40 from being insufficiently filled.

Figure 13:
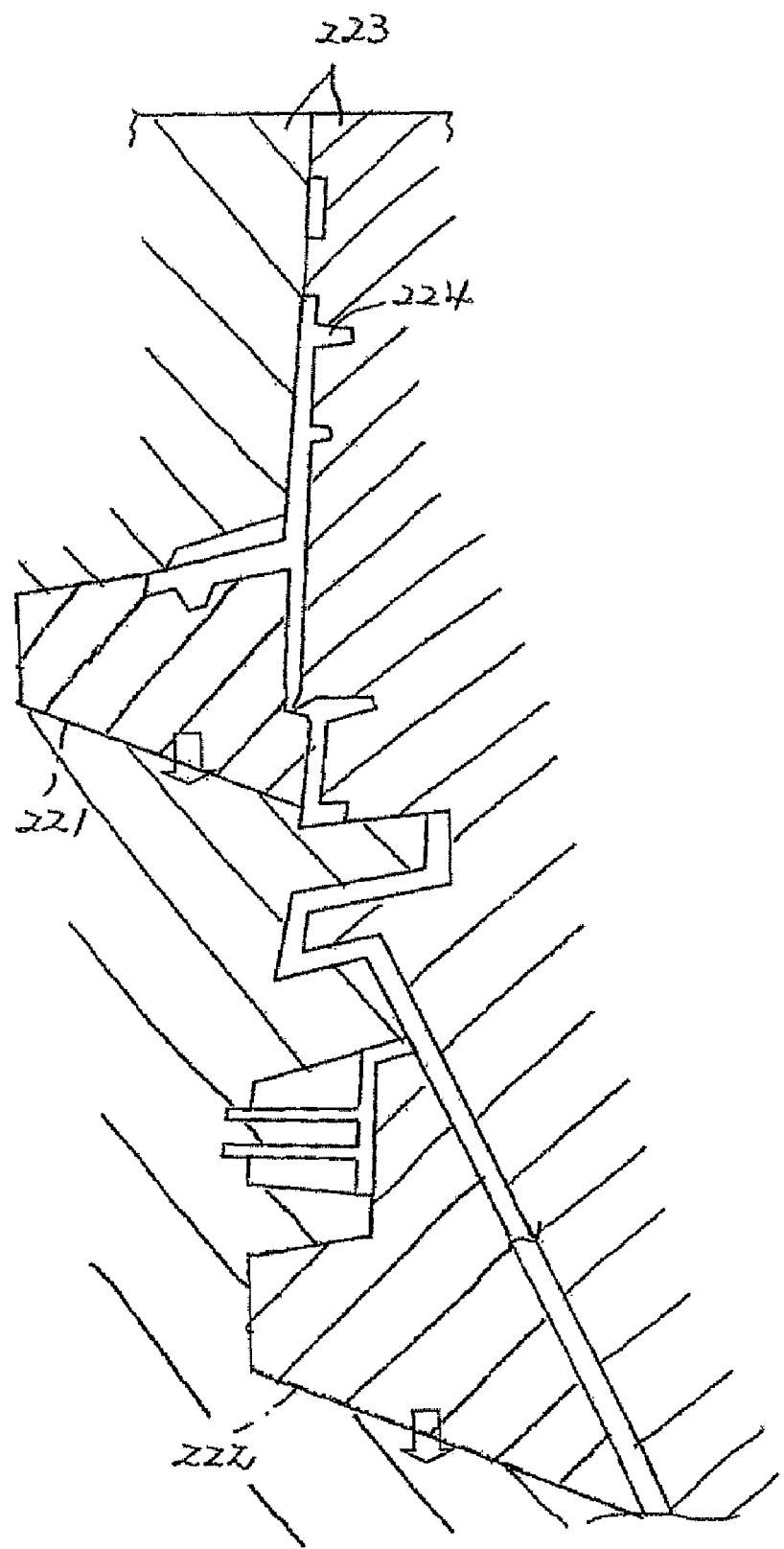
FIG. 13 is a cross-sectional view illustrating the formation of the core of FIG. 7.

While the mold is opened so that the body portion 21 and extension portion 22 form an angle of about 90°, the core 20 is mounted on the core mold 102. In this state, the core 20 cannot be molded due to an inverse shape 220 that is surrounded by a two-dot chain line in FIG. 8. Referring to FIG. 13, to perform injection molding of the core 20, slidable inserts 221 and 222 are used, and a cavity 224 is formed in a die 223 for molding the core 20 so that the core 20 is formed to have an angle of about 180° with respect to the finally folded shape (see FIG. 14).

Figure 16:
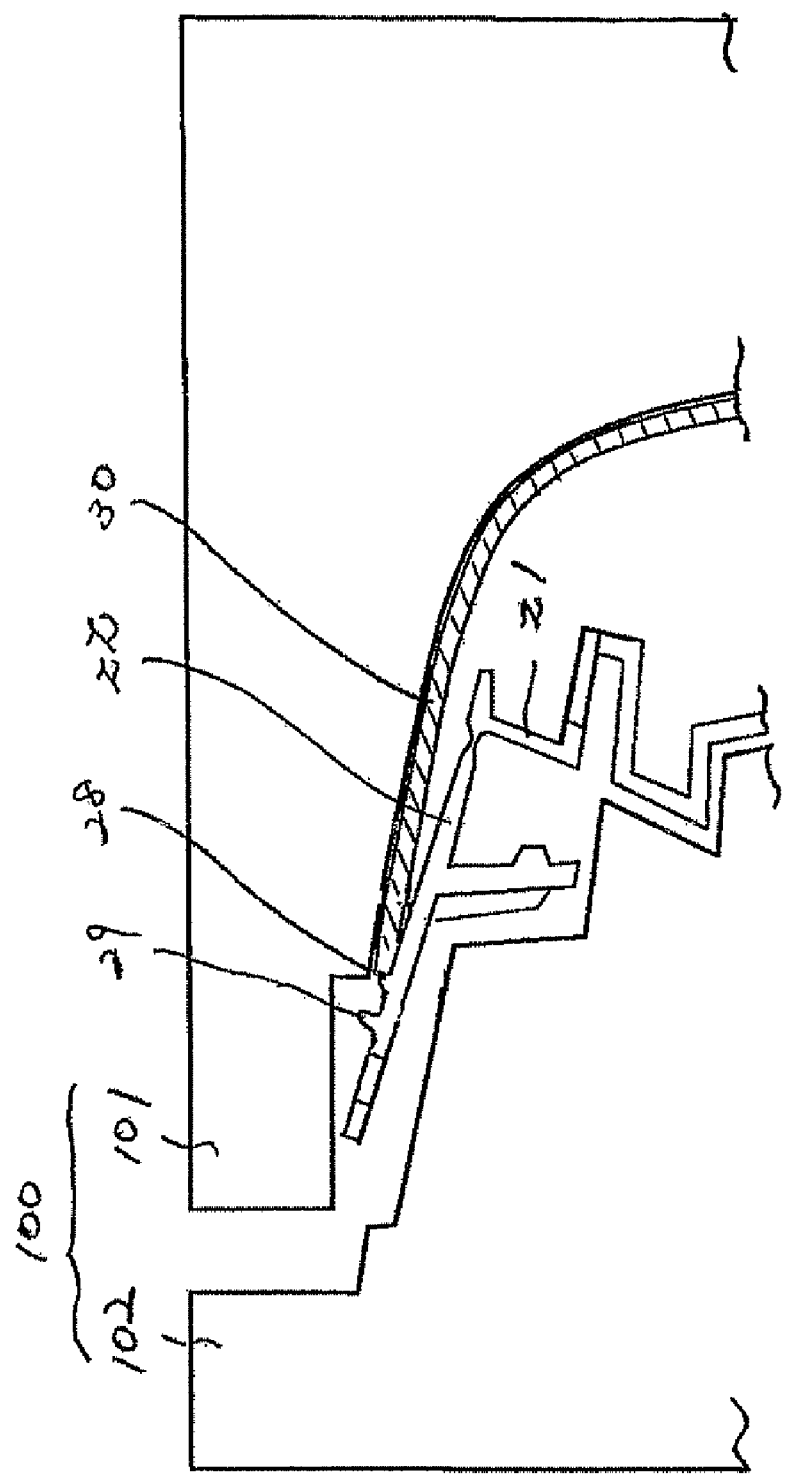
FIG. 16 is a cross-sectional view illustrating an undesirable example in which the core mounted on the mold is deformed and the core interferes with the skin when the mold is closed.

The injection molded core 20 is maintained in the shape during the molding. Then, if the temperature of the core 20 falls to normal temperature, the shape of the core 20 is set to an open shape where the body portion 21 and the extension portion 22 form an angle of about 180°. For this reason, if the hinge portion 23 is folded after the temperature of the product falls to the normal temperature, the hinge portion 23 is easily broken. Further, even though the area of the extension portion 22 is relatively large as shown in FIG. 16, the extension portion 22 floats toward the skin 30 from the mounting surface 104 of the core mold 102 when the elastic force of the hinge portion 23 is large. Likewise, when the area of the extension portion 22 is small, the skin 30 is deviated when the mold 100 is closed. Therefore, there is a concern that the product will wrinkle.

Figure 15:
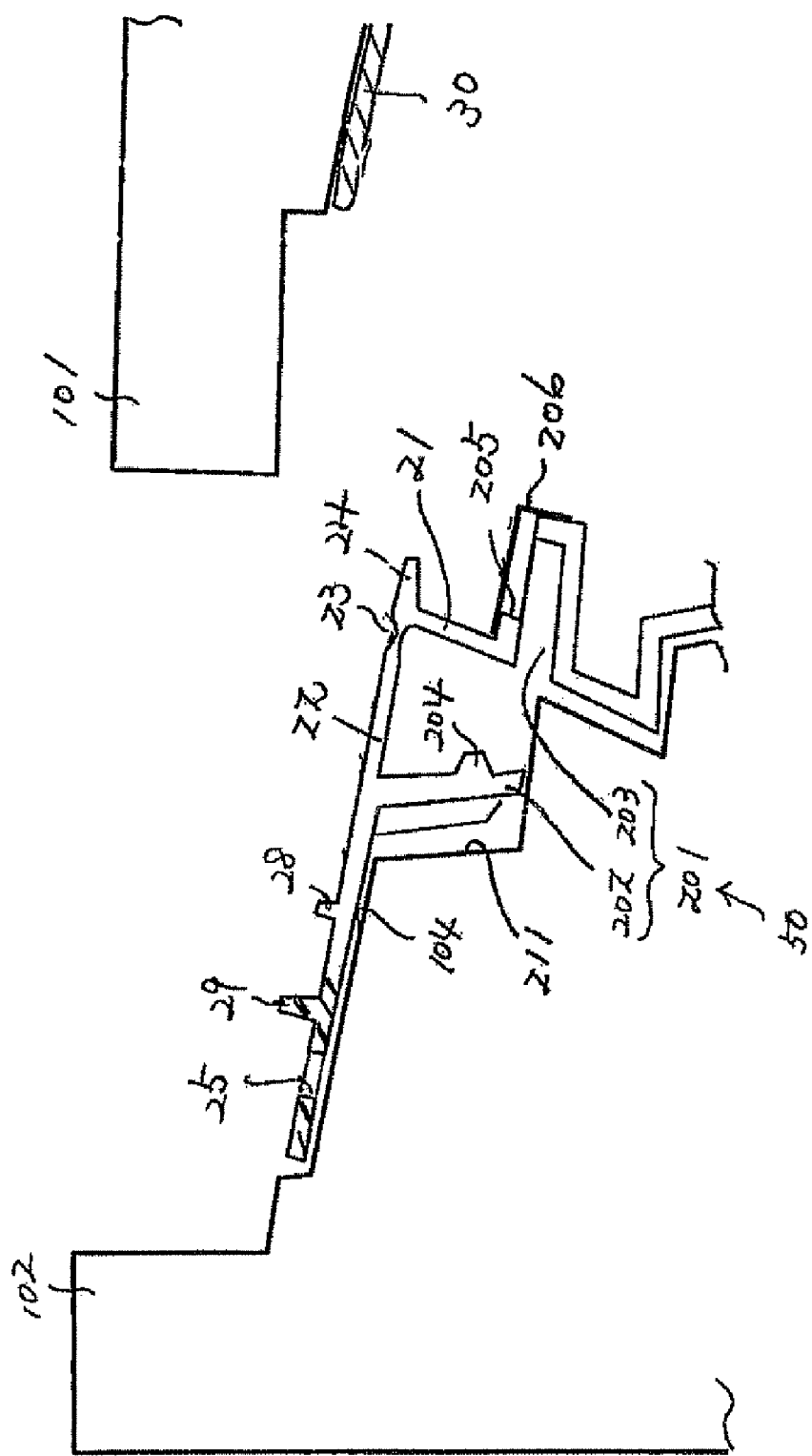
FIG. 15 is a cross-sectional view showing the core of FIG. 7 preliminarily shaped so as to correspond to the mounting surface of the mold and mounted on the mold.

A preliminary shaping process can be further included before the disposition process. In the preliminary shaping process, a folding crease is formed by folding the core 20 in a direction where the core is to be folded in the fixing process, so that the core 20 is preliminarily shaped to correspond to the mounting surface 104 of the mold 100 on which the core 20 is mounted. The reason for this is that even though the hinge portion 23 is folded, it is difficult to break the hinge portion 23. In addition, since the core 20 does not float toward the skin 30 as shown in FIG. 15, wrinkling the skin 30 is prevented when the mold 100 is closed.

The preliminary shaping process can be performed before the temperature of the core 20 falls to the normal temperature after the molding of the core 20. Since the preliminary shaping process is performed before the shape of the molded core 20 is set to the open shape, it is easy to shape the core 20 in a preliminary shape.

Figure 14:
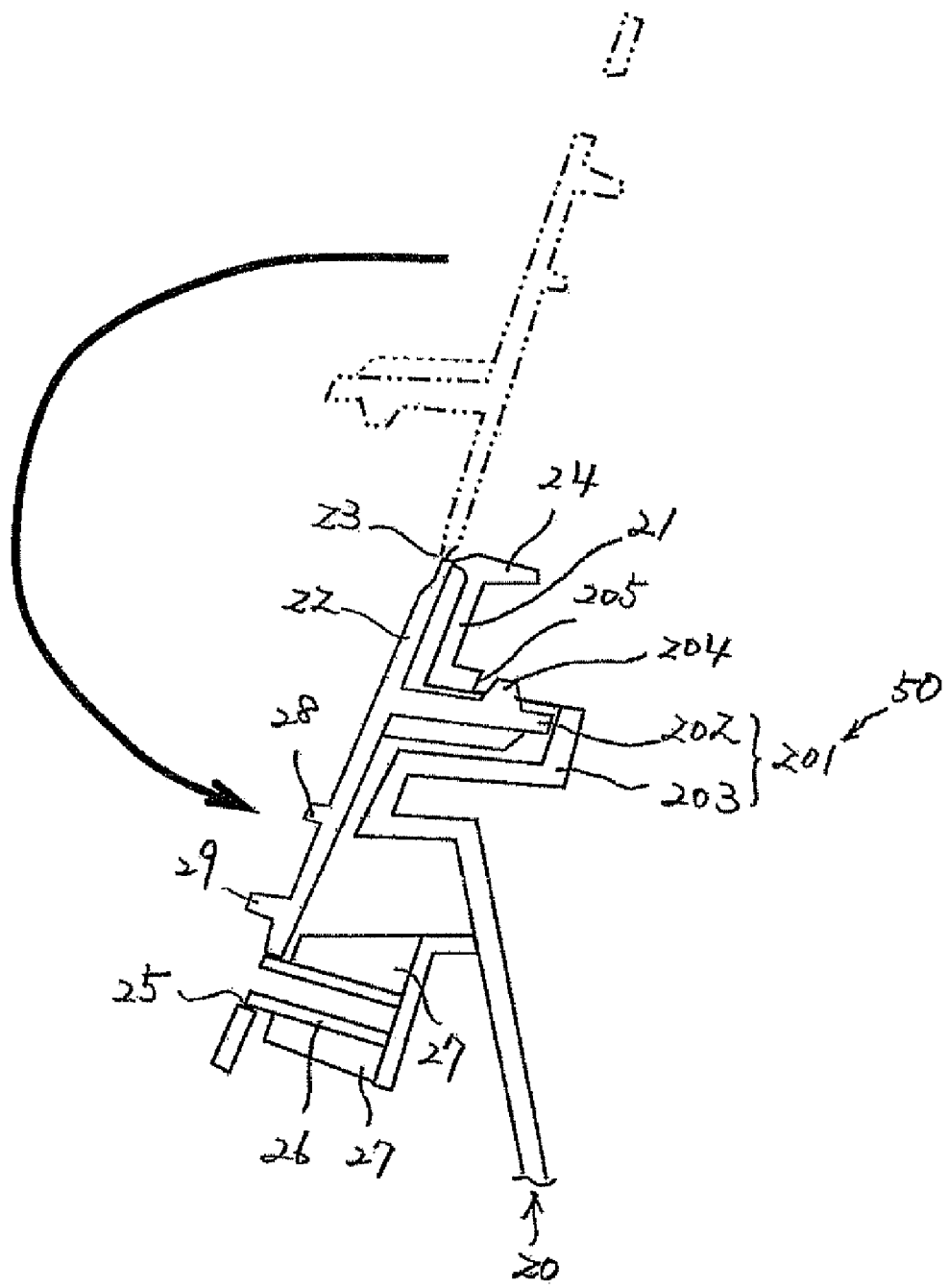
FIG. 14 is a cross-sectional view illustrating the molded core of FIG. 13 in a stored position.

In the preliminary shaping process, the folded core 20 can be fixed by the fixing member 50 so that a folding crease is formed, eliminating the need for a dedicated part such as a clip for maintaining the folded core 20. As shown in FIG. 14, the hinge portion 23 is folded by an angle of about 180° and is maintained in this state by using the pair of fitting members 201 as the fixing member 50 so that a folding crease is formed on the core 20. Since the fitting protrusion 202 is freely engaged with and disengaged from the fitting recess 203 by the claw member 204, the molded core 20 can be easily maintained while being folded. Further, when the core is mounted on the mold 100, the claw member 204 can be easily disengaged from the fitting recess 203. Accordingly, the time required to set the core 20 on the core mold 102 is not increased and manually altering the shape of the core 20, which is separated from the mounting surface 104, is not necessary, thereby reducing the time required to set the core 20 on the core mold 102. However, if the fixing member 50 does not have an engageable and disengageable structure, it is possible to preliminarily shape the core 20 by using a dedicated part such as a clip.

The third embodiment of the invention taught herein is now described with reference to FIGS. 17-21. Elements common to the elements shown in FIGS. 1 to 16 are indicated by the same reference numerals, and the description thereof is partially omitted.

The third embodiment is different from the first embodiment using the two-fold core 20 in that a core of which three or more portions are freely folded to one another is used.

Figure 17:
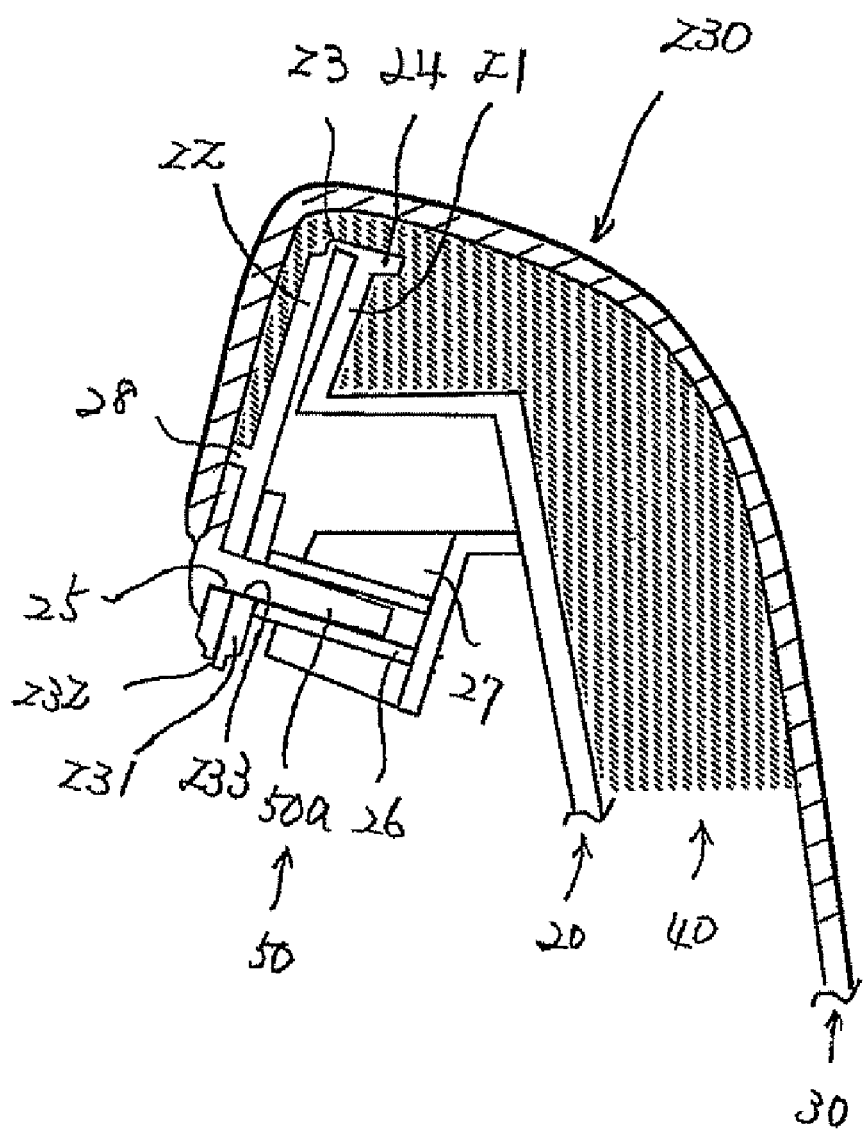
FIG. 17 is a cross-sectional view showing a main portion of a door trim to which a foam-molded member having a skin according to a third embodiment of the invention is applied, and showing that a folding-back portion is further superposed on a folded extension portion of a core and fixed to a body portion by a fixing member.

Referring to FIG. 17, in general the core 20 of the third embodiment further includes a second folding portion 232 and a folding-back portion 231. The second folding portion is formed at the end of an extension portion 22, and the folding-back portion is folded back at the second folding portion 232 so as to be superposed on the extension portion 22. The second folding portion 232 is composed of a hinge portion 232 thinner than other portions of the core 20. The hinge portion 232 is formed so that the folding-back portion 231 can be folded back to the back surface of the extension portion 22.

A second through hole 233 is formed in the folding-back portion 231 at a position symmetric with the through hole 25 of the extension portion 22 with respect to the hinge portion 232. When the folding-back portion 231 is folded back and superposed on the back surface of the extension portion 22, the through hole 25 communicates with the second through hole 233. The extension portion 22 and the folding-back portion 231 superposed on the extension portion 22 are fixed to the body portion 21 by a bolt 50a as the fixing member 50.

The door trim 230 is manufactured by the same method as in the first embodiment.

Figure 18:
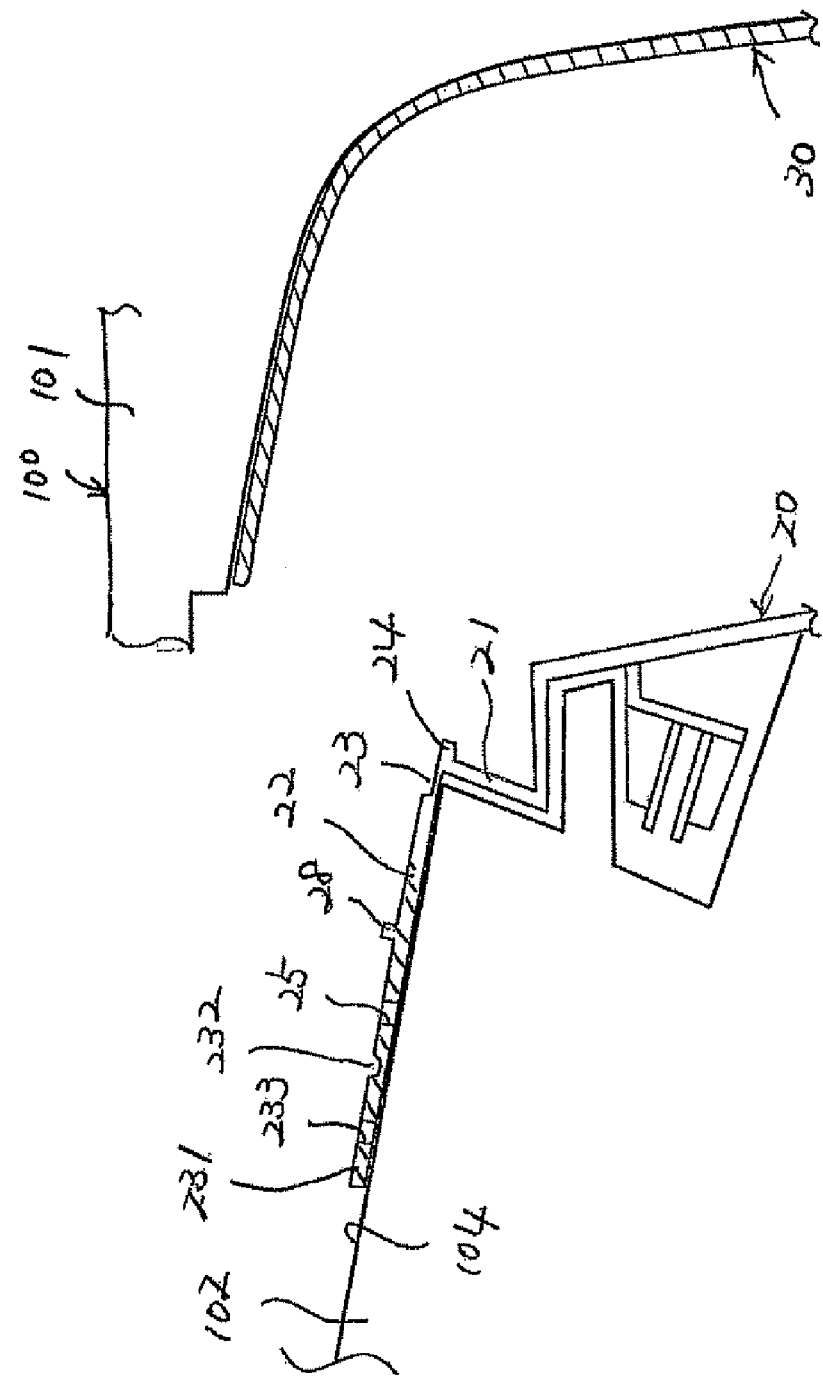
FIG. 18 is a cross-sectional view showing the skin and the core according to FIG. 17 disposed on an open mold.
Figure 19:
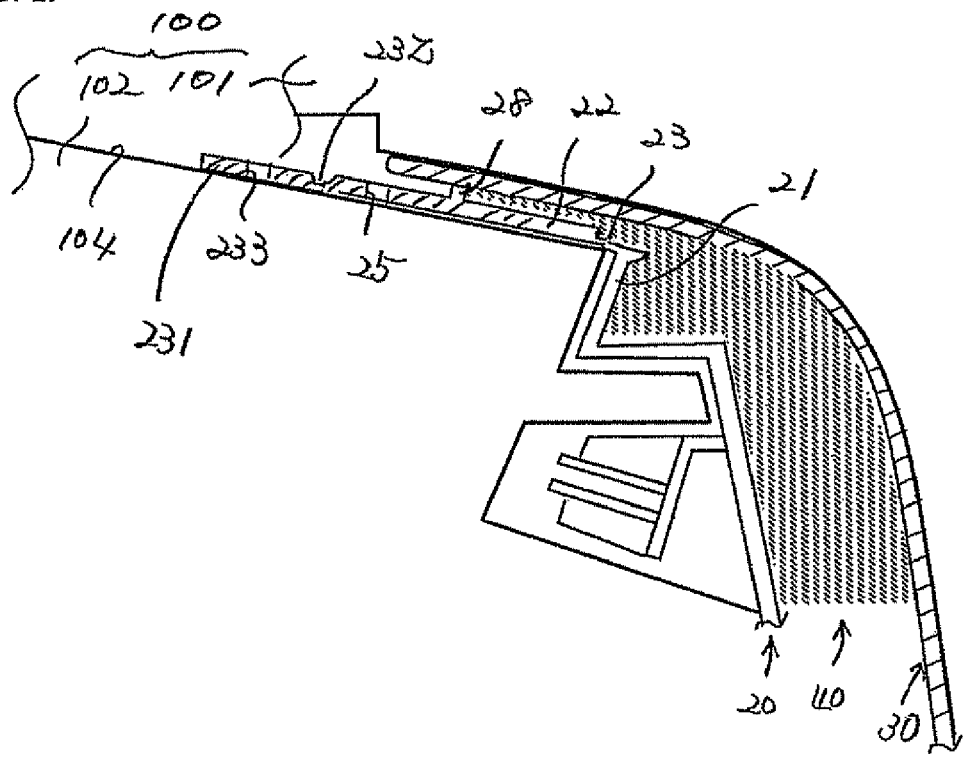
FIG. 19 is a cross-sectional view illustrating a process in which the mold of FIG. 18 is closed, and foam is filled.
Figure 20:
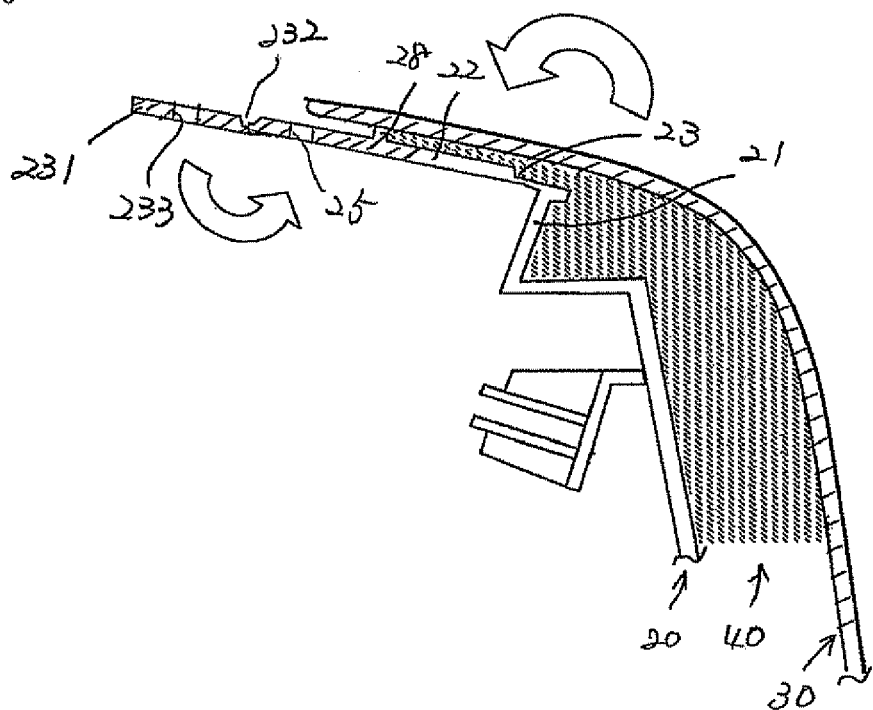
FIG. 20 is a cross-sectional view showing the core integrated into the skin and the foam taken out from the mold of FIG. 19.

Referring to FIG. 18, the extension portion 22 and the body portion 21 form an angle of about 90°, and the core 20 is mounted on a core mold 102 in the disposition process. Referring to FIG. 19, the mold 100 is closed, and a predetermined amount of the foam 40 is filled in the space between the core 20 and the skin 30 in the filling process. Referring to FIG. 20, the mold 100 is opened, and the core 20 integrated with the skin 30 and the foam 40 is taken out from the mold 100. The folding-back portion 231 is folded back to the back surface of the extension portion 22 at the hinge portion 232 and is superposed on the back surface of the extension portion 22. Then, as shown in FIG. 17, the bolt 50a inserted through the through hole 25 and the second through hole 233 is fastened to a fixing boss 26, and the extension portion 22 and the folding-back portion 231 are fixed to the body portion 21 in the fixing process.

The folding-back portion 231 is added at the end of the extension portion 22 to sufficiently ensure the area of the extension portion 22 fixed to the core mold 102 like in the second embodiment even though the required folding length La is shortened. Accordingly, while meeting the demand for the restriction on the layout or the formative design, it is possible to prevent the skin 30 from being deviated, to prevent the foam 40 from leaking and to prevent the foam 40 from being insufficiently filled. Since the extension portion 22 is superposed on the folding-back portion 231, rigidity is improved. Therefore, fastening using the bolt 50a is strengthened.

Figure 21:
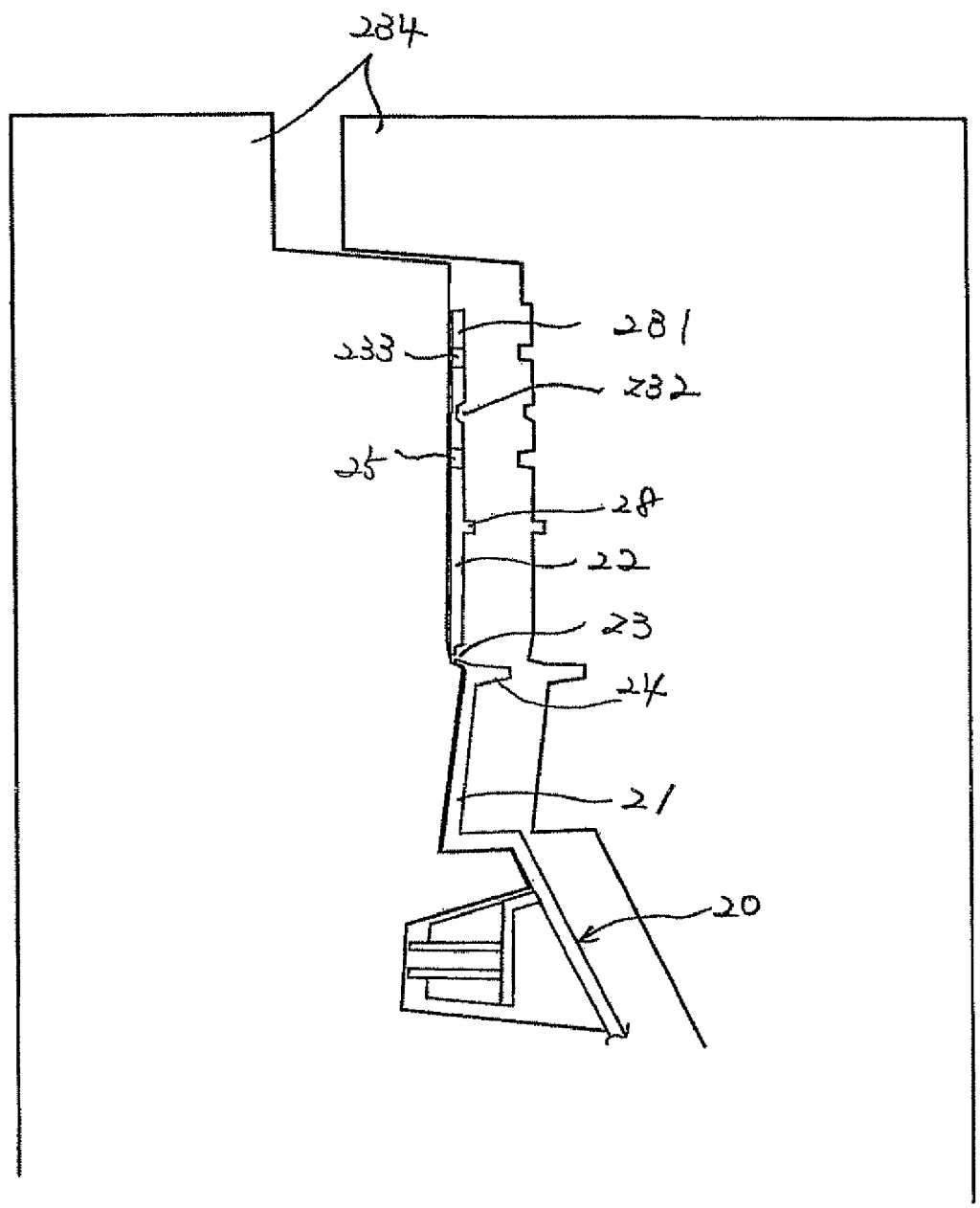
FIG. 21 is a cross-sectional view of a die for molding the core according to FIG. 17.

Referring to FIG. 21, the core 20 is molded in the die 234 so that the body portion 21, the extension portion 22 and the folding-back portion 231 form an angle of about 180°. As in the second embodiment, the preliminary shaping process can be added for shaping the core 20 in a preliminary shape corresponding to the mounting surface 104 of the mold 100.

Figure 22:
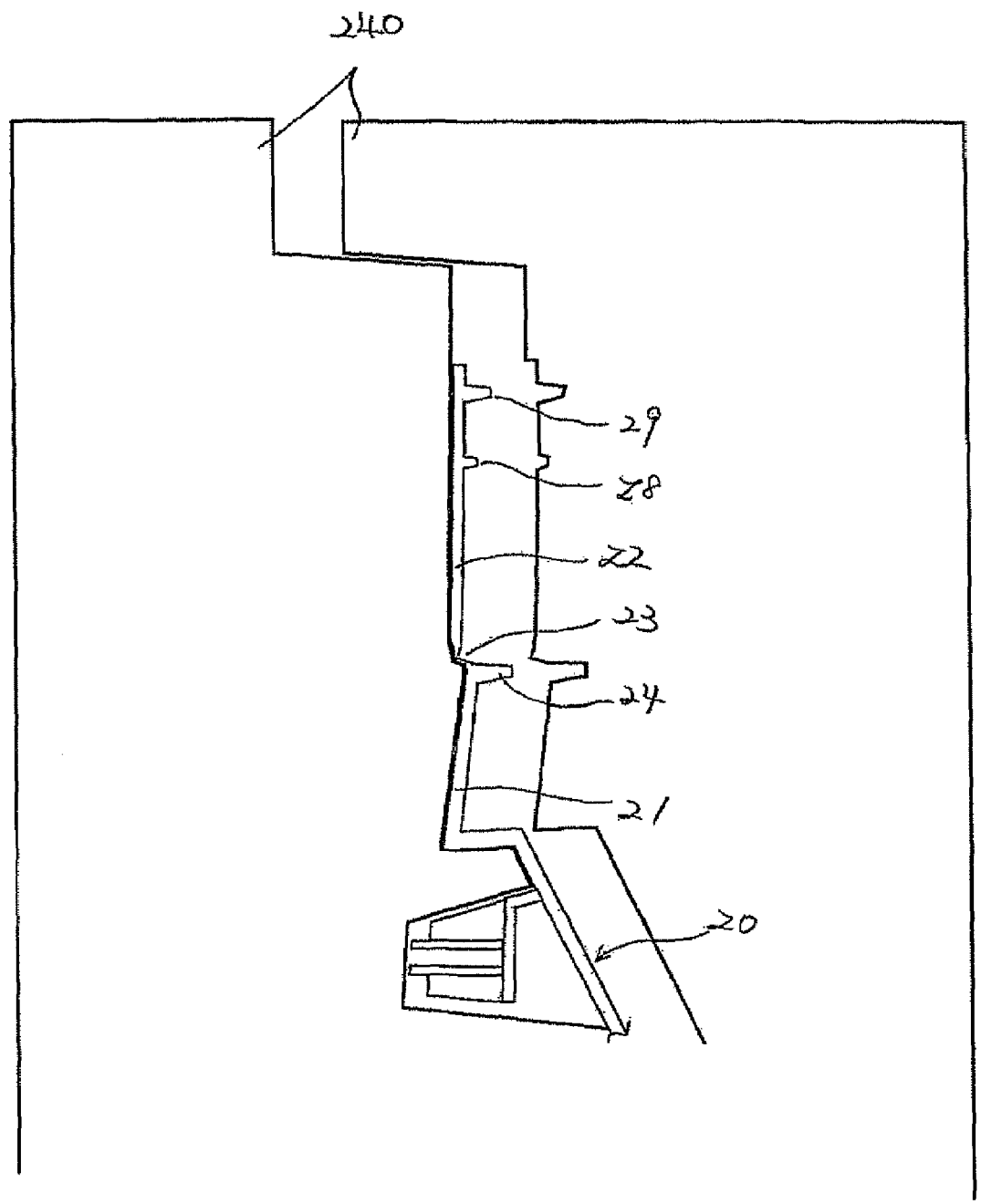
FIG. 22 is a cross-sectional view of a die for molding a core according to a fourth embodiment.
Figure 23:
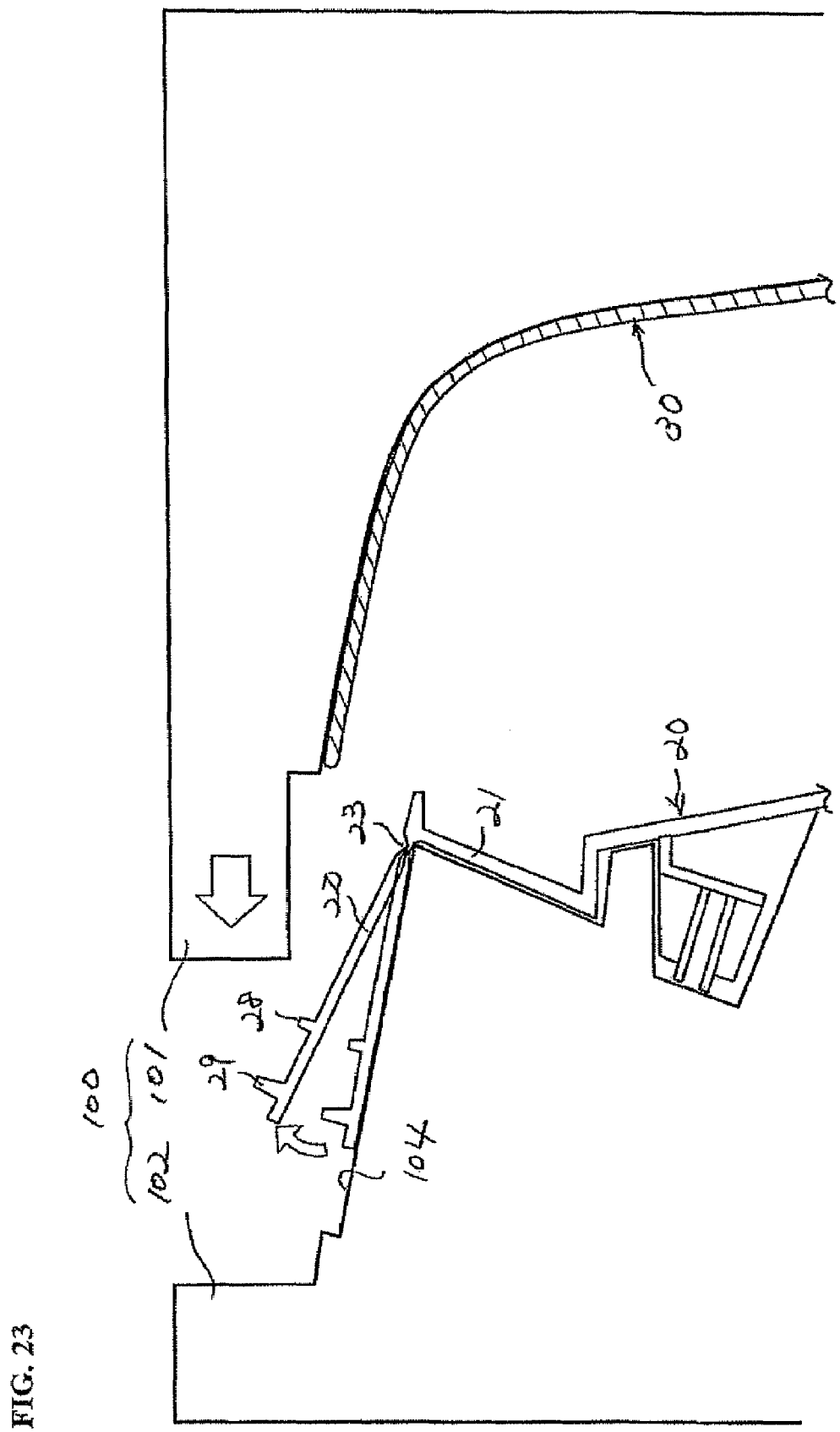
FIG. 23 is a cross-sectional view showing a core according to FIG. 22 deformed and mounted on the mold.

A fourth embodiment is next described with initial reference to FIGS. 22 and 23 Elements common to the elements shown in FIGS. 1 to 21 are indicated by the same reference numerals, and the description thereof is partially omitted.

Referring first to FIG. 22, the injection molding of the core 20 is performed in a die 240 so that the core 20 has a shape capable of being molded without using a slide mold. In FIG. 23, the mold 100 includes a core mold 102 on which the core 20 is disposed and a cavity mold 101 on which a skin 30 is disposed. The cavity mold 101 can approach and be separated from the core mold 102. While the extension portion 22 and the body portion 21 form an angle of about 90°, the core 20 is mounted on a mounting surface 104 of the core mold 102 in the disposition process. The injection molded core 20 is maintained in the shape during the molding. Then, if the temperature of the core 20 falls to normal temperature, the shape of the core 20 is set to an open shape where the body portion 21 and the extension portion 22 form an angle of about 180°. For this reason, the extension portion 22 does not come in close contact with the mounting surface 104 of the core mold 102 and is separated therefrom so that the extension portion floats toward the skin 30. In this state, if the mold 100 is closed, the extension portion 22 interferes with the skin 30, and the skin 30 is deviated, potentially causing wrinkles or holes. The extension portion 22 can be held on the mounting surface 104 in order to close the mold 100 before the cavity mold 101 and the core mold 102 approach each other. Since the extension portion 22 is positioned, it is possible to prevent the skin 30 from being deviated, to prevent the foam 40 from leaking and to prevent the foam 40 from being insufficiently filled when the mold 100 is closed. "Before the cavity mold 101 approaches the core mold 102" means the time before the skin 30 is deviated due to the interference between the extension portion 22 and the skin 30 caused by the approach of the cavity mold 101 to the core mold 102 and immediately after the core 20 is mounted on the core mold 102.

The interlocking structure includes the structure of the fourth embodiment interlocking using the shape of the core 20 and the shape of the cavity mold 101 and the structure of the fifth embodiment for converting the operation where the cavity mold and the core mold approach each other into an operation where the extension portion 22 is moved to the mounting surface 104 of the core mold 102.

The latter non-interlocking structure may include, for example, a pressing unit 280 exemplified in a sixth embodiment for pressing the extension portion 22 against the mounting surface 104, a pulling unit 290 exemplified in a seventh embodiment for pulling the extension portion 22 from the mounting surface 104, and a suction unit 300 exemplified in a modification of the seventh embodiment for sucking the extension portion 22 from the mounting surface 104. Various structures that hold the extension portion 22 on the mounting surface 104 are sequentially described below.

The holding of the extension portion 22 on the mounting surface 104 may be performed until the foam 40 is completely filled. When gas generated due to the filling of the foam 40 is discharged, the holding of the extension portion 22 on the mounting surface 104 is temporarily released. This is because when the mold 100 is slightly opened during the discharge of the gas, the product can wrinkle while the extension portion 22 is held on the mounting surface 104. When the seal portion 60 capable of discharging gas generated due to the filling of the foam 40 is provided like the first embodiment, it is not necessary to open the mold 100 in order to discharge the gas.

During the curing of the foam 40, the extension portion 22 may not be held on the mounting surface 104. Since a mold clamping force of the mold 100 is applied to the extension portion 22 and the foam 40 is completely filled, the extension portion 22 can sufficiently resist a floating force generated toward the skin 30. Needless to say, when the core 20 integrated into the skin 30 and the foam 40 is taken out from the core mold 102, the holding of the extension portion 22 on the mounting surface 104 is released so that the core 20 is not fixed to the core mold 102.

Figure 24A:
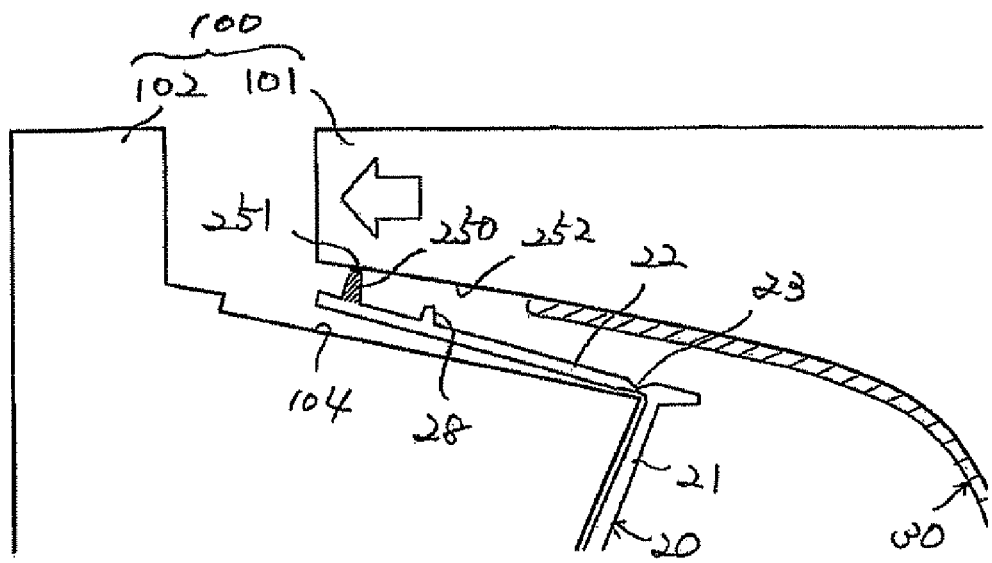
FIGS. 24A and 24B are cross-sectional views of a main portion used to describe the fourth embodiment.
Figure 24B:
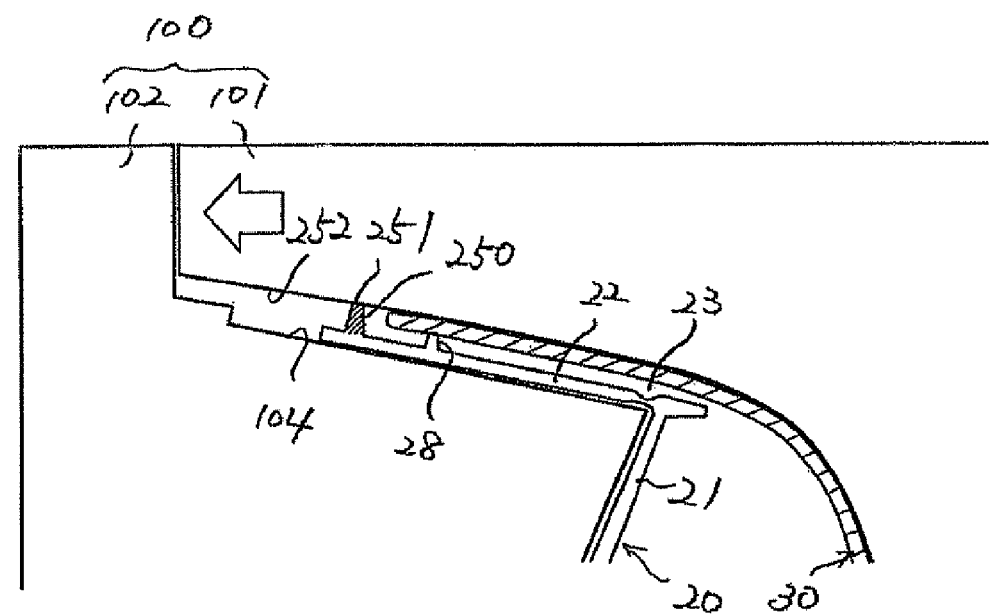

According to a fourth embodiment in FIGS. 24A and 24B, the extension portion 22 is pressed against and held on the mounting surface 104 in order to close the mold 100 in interlock in the operation where the core mold 102 and the cavity mold 101 approach each other.

The core 20 includes a protrusion 250 that protrudes from the extension portion 22. The cavity mold 101 is interlocked with the operation of approaching the core mold 102 and includes a guide surface 252 that comes in contact with a protruding end 251 of the protrusion 250 so as to move the extension portion 22 to the mounting surface 104 of the core mold 102. The flange 29 in FIG. 1 on which the door weatherstrip 70 is mounted can be used as the protrusion 250 of the extension portion 22. Accordingly, a dedicated protrusion used to press the extension portion 22 is not necessary.

When the mold 100 begins to be closed in the filling process, the guide surface 252 of the cavity mold 101 comes in contact with the protruding end 251 of the protrusion 250. If the cavity mold 101 is further moved, the extension portion 22 is pressed by the guide surface 252 through the protrusion 250. Accordingly, the extension portion 22 is turned about the hinge portion 23 in a counterclockwise direction in the drawing, and is thus moved to the mounting surface 104 of the core mold 102. When the cavity mold 101 is moved to a mold closing position, the extension portion 22 is pressed against the mounting surface 104 and is held on the mounting surface 104. In this way, while the extension portion 22 is pressed against the mounting surface 104 and comes in close contact with the mounting surface 104, the foam molding can be performed.

Figure 25A:
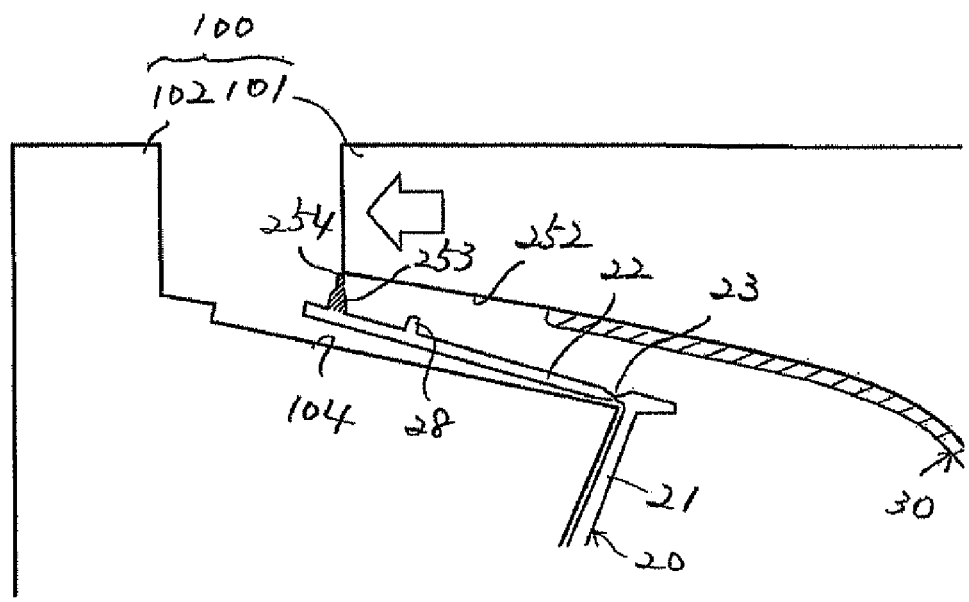
FIGS. 25A and 25B are cross-sectional views of a main portion used to describe a modification of the fourth embodiment.
Figure 25B:
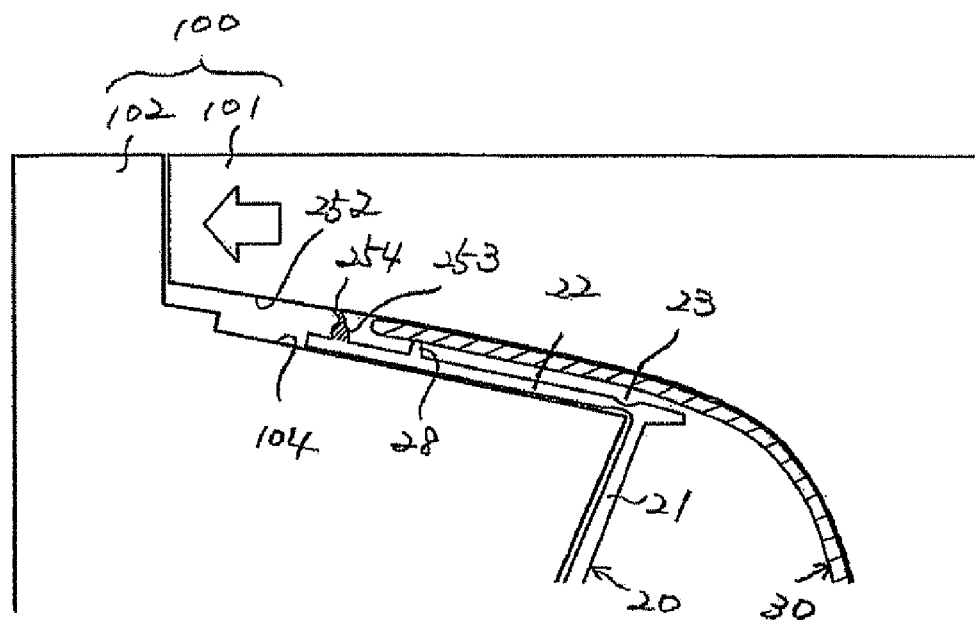

In the modification to the fourth embodiment shown in FIGS. 25A and 25B, a protruding end 254 of a protrusion 253 is formed to be thin so that the protruding end 254 has flexibility. When the guide surface 252 of the cavity mold 101 comes in contact with the protruding end 254 of the protrusion 253, the flexible protruding end 254 is bent. The extension portion 22 can further come in close contact with the mounting surface 104 and be held by using a generated reaction force. Even after the mold 100 is closed, the reaction force of the protrusion 253 is generated and the extension portion 22 can continue to come in close contact with the mounting surface 104. It is possible to adjust the generated reaction force and to easily set optimum manufacturing conditions by adjusting the thickness of the protruding end 254.

Figure 26A:
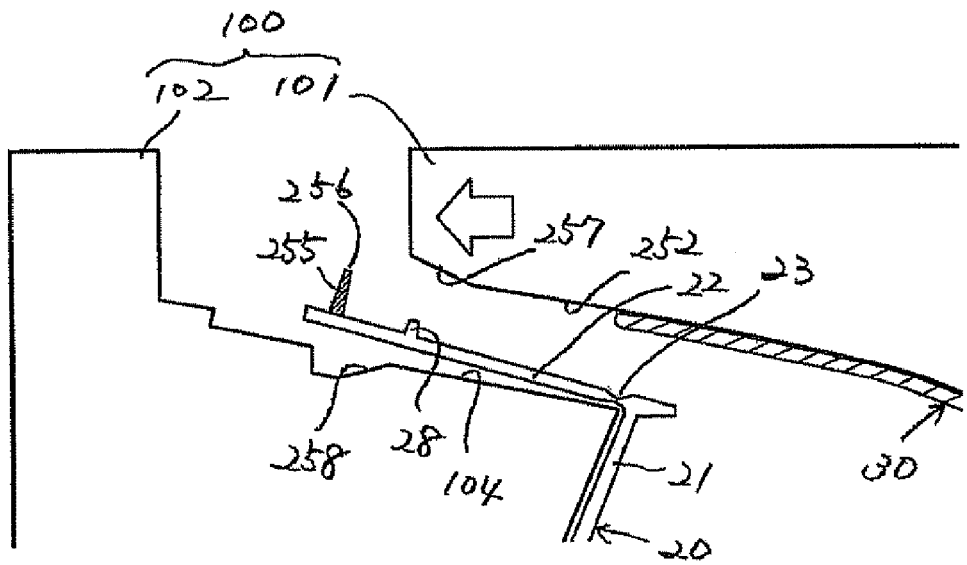
FIGS. 26A and 26B are cross-sectional views of a main portion used to describe another modification of the fourth embodiment.
Figure 26B:
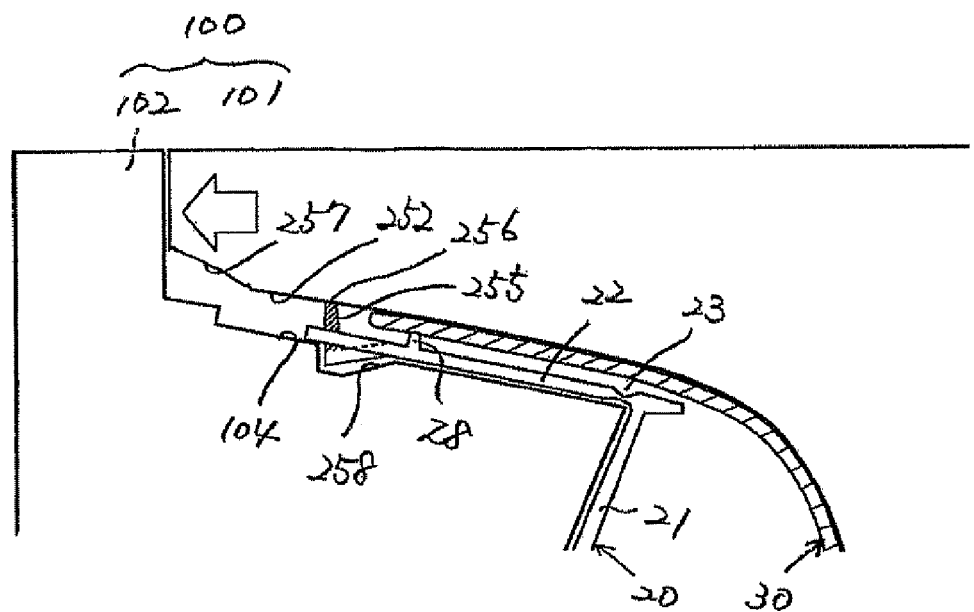
Figure 27:
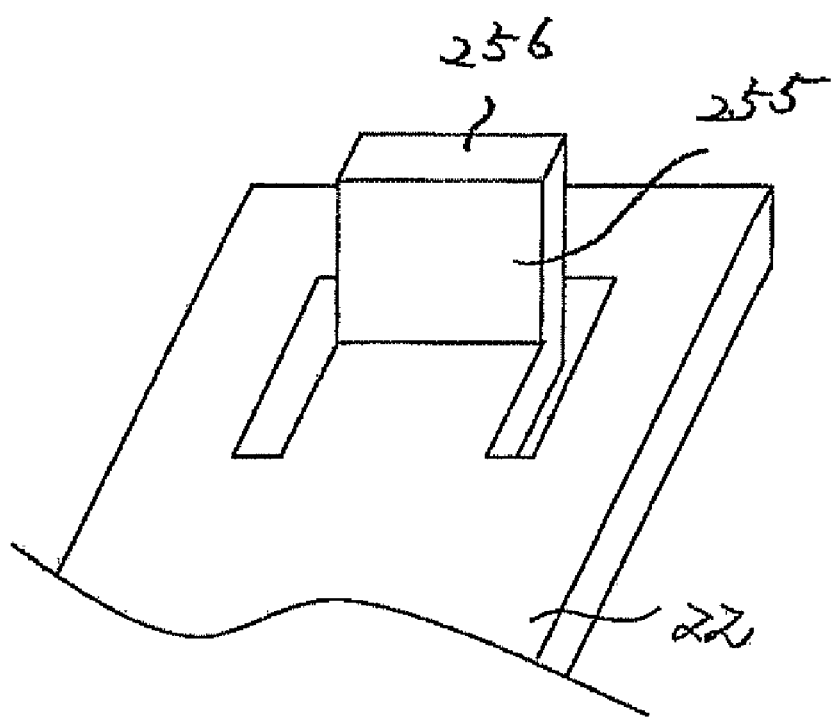
FIG. 27 is a perspective view of a protrusion provided in the vicinity of the end of the extension portion of FIGS. 26A and 26B.

In the modification to the fourth embodiment shown in FIGS. 26A, 26B and 27, the root of the protrusion 255 is supported by the extension portion 22 like a cantilever so that the entire protrusion 255 has flexibility. A tapered face 257 is formed at the end of the guide surface 252 of the cavity mold 101 in a direction where the mold is moved into the open position. The protrusion 255 is more smoothly guided by the tapered face 257. A clearance groove 258, which allows the protrusion 255 to be bent, is formed on the core mold 102.

When the guide surface 252 of the cavity mold 101 comes in contact with a protruding end 256, the entire protrusion 255 is bent. The extension portion 22 can further come in close contact with the mounting surface 104 and be held by a reaction force. Even after the mold 100 is closed, the reaction force of the protrusion 255 is generated, and the extension portion 22 can continue to come in close contact with the mounting surface 104. In addition, it is possible to adjust the generated reaction force and to easily set optimum manufacturing conditions by adjusting the thickness of the root of the protrusion 255.

Figure 28A:
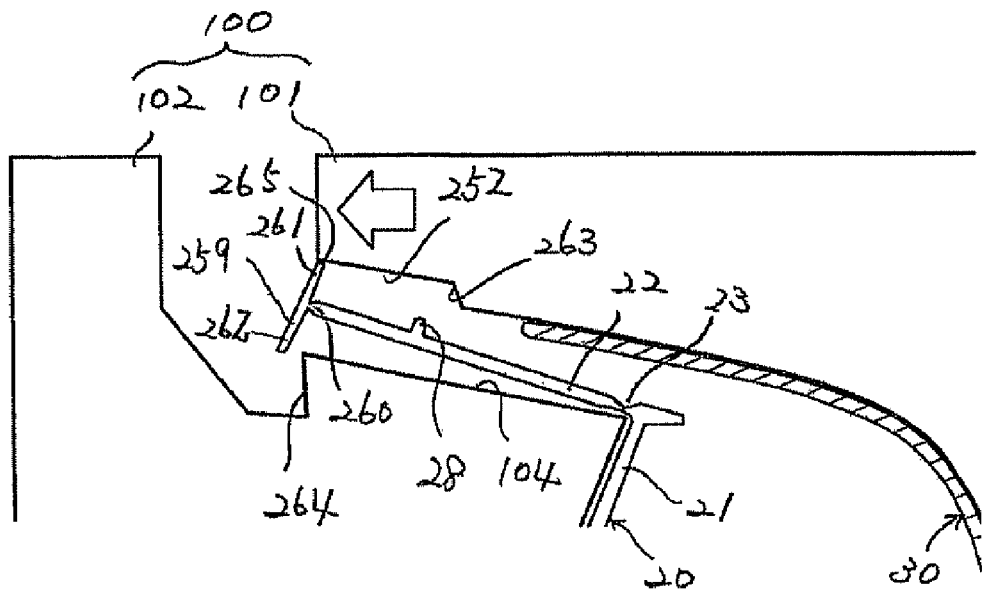
FIGS. 28A and 28B are cross-sectional views of a main portion used to describe still another modification of the fourth embodiment.
Figure 28B:
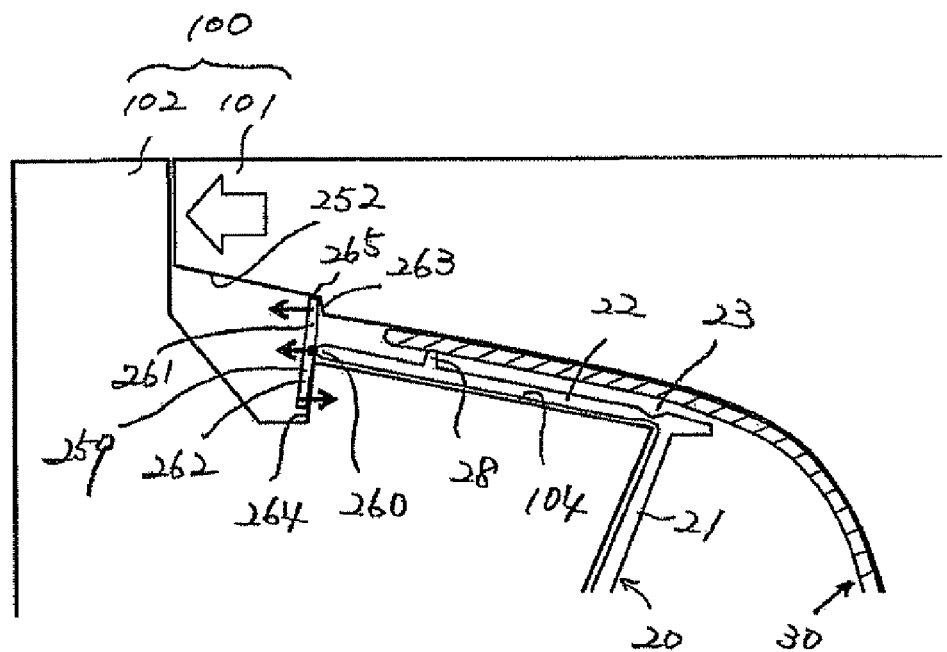

In the modification to the fourth embodiment shown in FIGS. 28A and 28B, a protrusion 259 has a door shape movably provided at the end of the extension portion 22. The protrusion 259 includes a first plate 261 that protrudes upward from the extension portion 22 in the drawing, and a second plate 262 that protrudes downward from the extension portion 22 in the drawing. The first and second plates 261 and 262 are integrally formed with each other. A connection portion 260 between the protrusion 259 and the extension portion 22 is thin so that the protrusion 259 is turned about the connection portion 260. A first stepped portion 263 that catches the first plate 261 is formed on the guide surface 252 of the cavity mold 101, and a second stepped portion 264 that catches the second plate 262 is formed on the core mold 102.

When the cavity mold 101 is moved, and the first stepped portion 263 of the guide surface 252 comes in contact with a protruding end 265 of the first plate 261, the protrusion 259 is turned about the connection portion 260 in a counterclockwise direction in the drawing. When the cavity mold 101 is moved to a mold closing position, the first stepped portion 263 of the guide surface 252 presses the first plate 261. The second plate 262 turned about the connection portion 260 is caught by the second stepped portion 264 of the core mold 102 and is pressed against the second stepped portion 264. A pressing force that presses the second plate 262 against the second stepped portion 264 is changed into a force that pulls the extension portion 22 into the core mold 102 and is applied to the extension portion 22. The extension portion 22 is pressed against and comes in close contact with the mounting surface 104 and is held on the mounting surface 104. In this way, the extension portion 22 can further come in close contact with the mounting surface 104 and be held using a lever. Even after the mold 100 is closed, the force that pulls the extension portion 22 into the core mold 102 is generated. For this reason, the extension portion 22 can continue to come in close contact with the mounting surface 104. The generated force can be easily adjusted and optimum manufacturing conditions can be easily set by adjusting the thickness of each of the plates 261 and 262 of the protrusion 259.

Figure 29A:
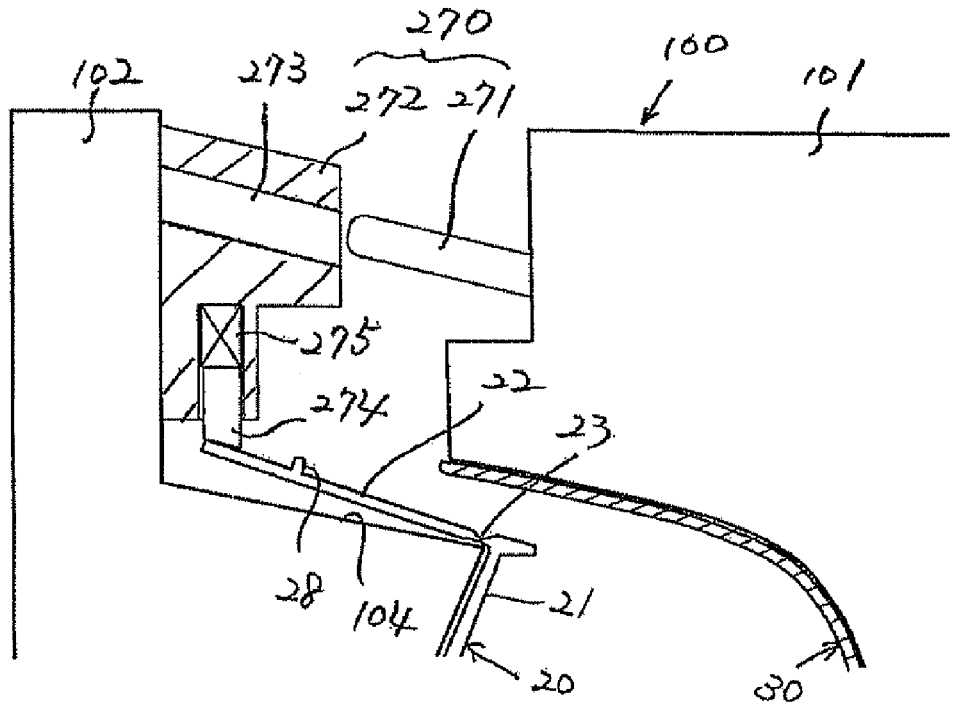
FIGS. 29A and 29B are cross-sectional views of a main portion used to describe a fifth embodiment.
Figure 29B:
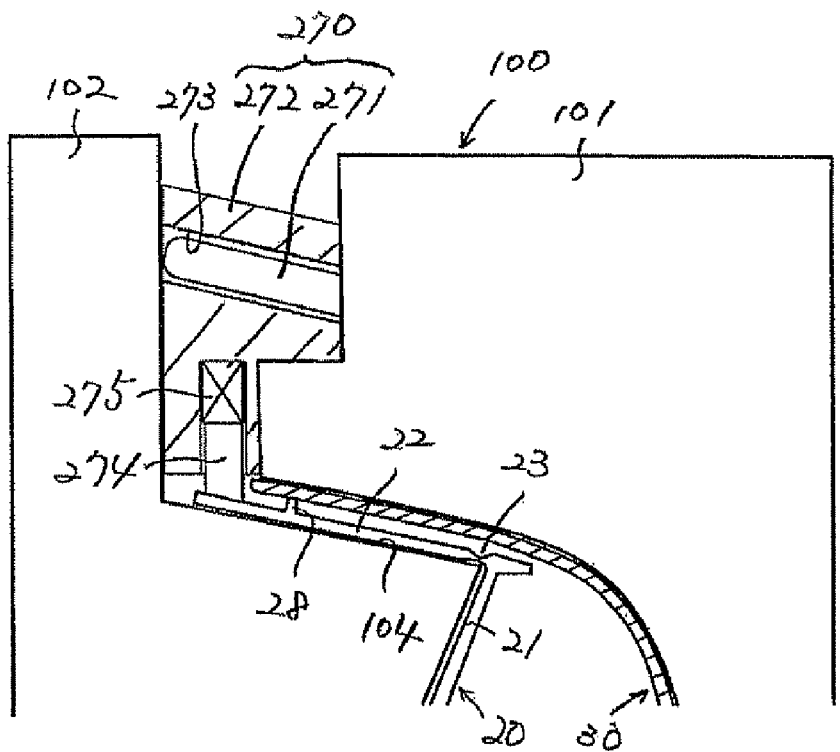

According to a fifth embodiment shown in FIGS. 29A and 29B, like the fourth embodiment, the extension portion 22 is pressed against and held on the mounting surface 104 in order to close the mold 100 in interlock with the operation where the core mold 102 and the cavity mold 101 approach each other.

In the fifth embodiment, an extension portion 22 is pressed against a mounting surface 104 and held on the mounting surface by a converting unit 270. The converting unit 270 has an angular slide structure and includes an angular pin 271 on the cavity mold 101 and a slide mold 272 that is slidably provided in the core mold 102. The slide mold 272 includes a guide hole 273 into which the angular pin 271 is inserted, a pin member 274 that presses the extension portion 22 against the mounting surface 104, and a resilient member such as a spring 275 that applies a resilient force to the pin member 274. The resilient member is formed to be capable of adjusting the load that presses the extension portion 22 against the mounting surface 104.

When the mold 100 begins to be closed in the filling process, the angular pin 271 of the cavity mold 101 is inserted into the guide hole 273. When the cavity mold 101 is further moved, the slide mold 272 is mechanically interlocked and moved toward the extension portion 22 by the common operation of the angular pin 271 and the guide hole 273. Then, when the cavity mold 101 is moved to a mold closing position, the extension portion 22 is pressed against and comes in close contact with the mounting surface 104 by the pin member 274, to which a resilient force is applied. Accordingly, the extension portion is held on the mounting surface 104. In this way, while the extension portion 22 is pressed against and comes in close contact with the mounting surface 104, the foam molding can be performed.

Figure 30A:
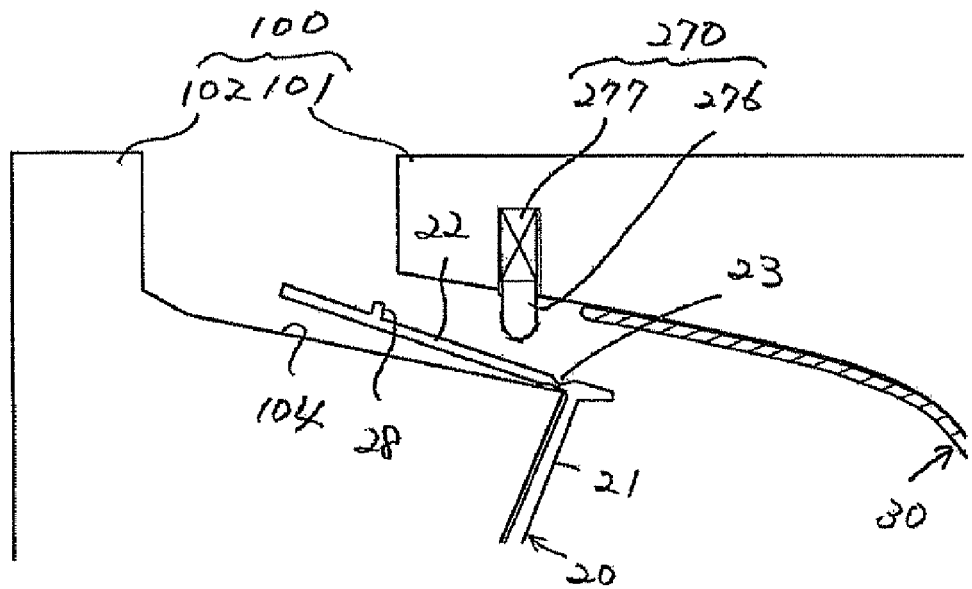
FIGS. 30A and 30B are cross-sectional views of a main portion used to describe a modification of the fifth embodiment.
Figure 30B:
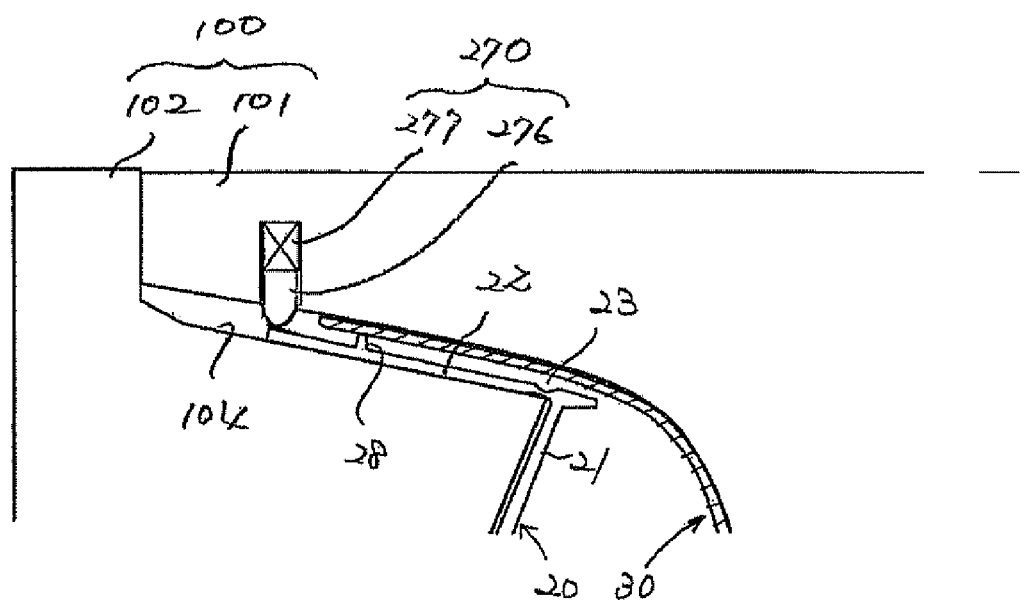

In the modification to the fifth embodiment shown in FIGS. 30A and 30B, a pin member 276 for pressing the extension portion 22 against the mounting surface 104 and a resilient member such as a spring 277 for applying a resilient force to the pin member 276 are provided in the cavity mold 101 as the converting unit 270. The resilient member is formed to be capable of adjusting load that presses the extension portion 22 against the mounting surface 104. Since corners of the pin member 276 are formed in a rounded shape, the pin member 276 can easily pass over the rib portion 28.

When the core mold 102 and the cavity mold 101 approach each other, the pin member 276 comes in contact with the extension portion 22. The pin member 276 moves the extension portion 22 toward the mounting surface 104 of the core mold 102 by a resilient force that is applied by the resilient member. Then, when the cavity mold 101 is moved to a mold closing position, the extension portion 22 is pressed against and comes in close contact with the mounting surface 104 by the pin member 276, to which a resilient force is applied. Accordingly, the extension portion is held on the mounting surface 104.

Figure 31A:
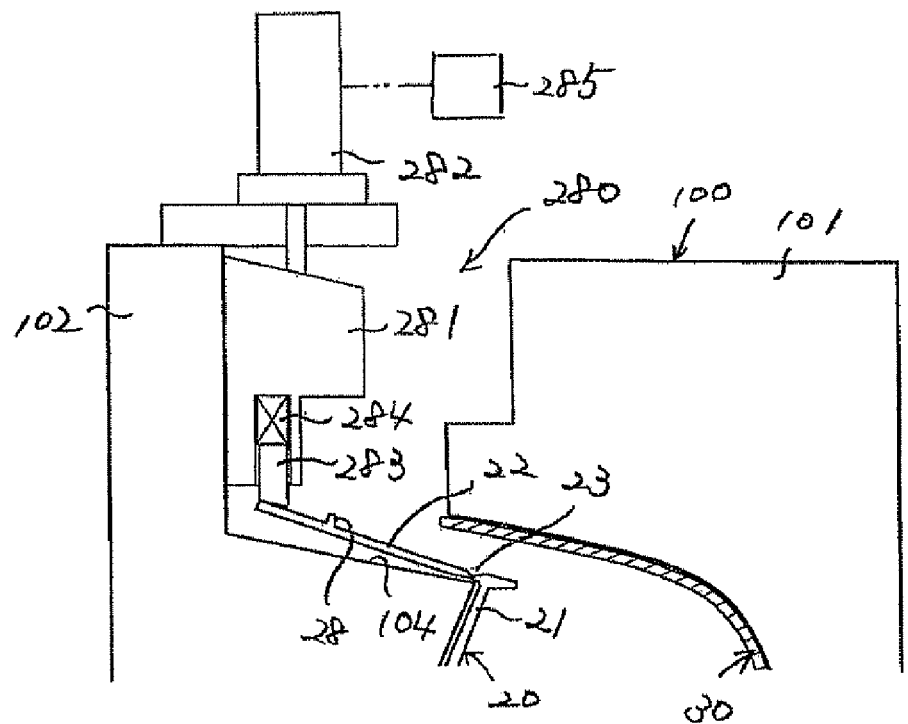
FIGS. 31A and 31B are cross-sectional views of a main portion used to describe a sixth embodiment.
Figure 31B:
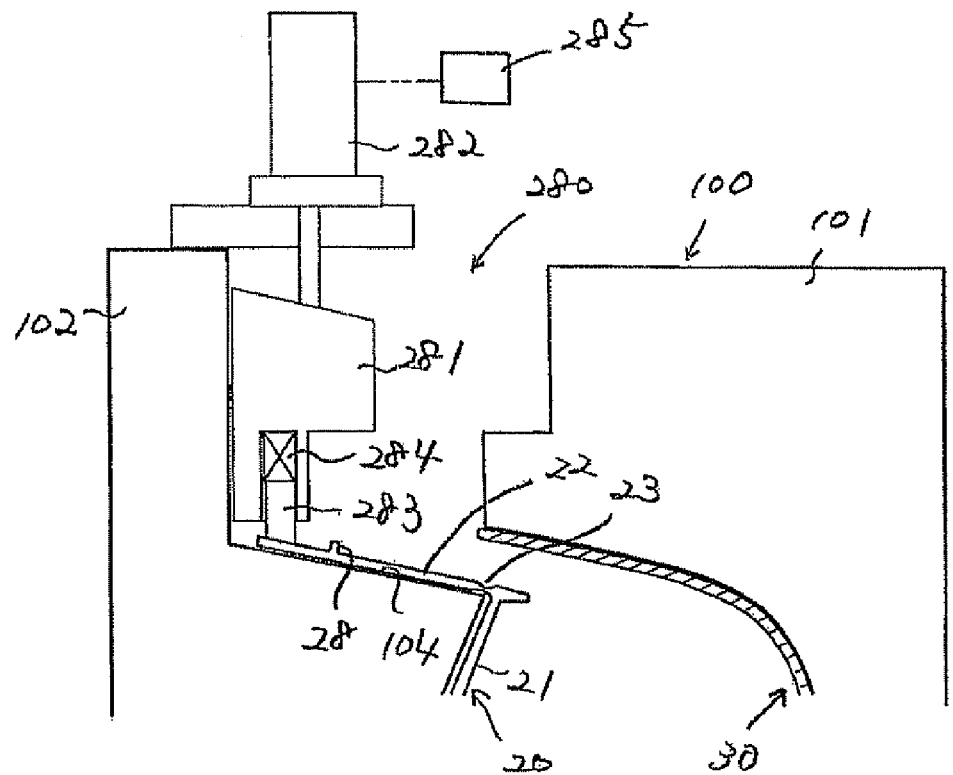

According to a sixth embodiment shown in FIGS. 31A and 31B, an extension portion 22 is held on the mounting surface 104 without interlock with the operation where a core mold 102 and a cavity mold 101 approach each other. Instead, a pressing unit 280 provided on the core mold 102 presses the extension portion 22 against the mounting surface 104 so that the extension portion 22 is mounted on the mounting surface 104.

The pressing unit 280 includes a slide mold 281 that is slidably provided on the core mold 102, and a drive member 282 for driving the slide mold 281 so that the slide mold is moved forward and backward. The slide mold 281 is provided with a pin member 283 that presses the extension portion 22 against the mounting surface 104, and a resilient member such as a spring 284 that applies a resilient force to the pin member 283. The resilient member is formed to be capable of adjusting load that presses the extension portion 22 against the mounting surface 104. The drive member 282 is composed of a fluid pressure cylinder that is operated by fluid pressure such as oil pressure or air pressure. The fluid pressure cylinder 282 is connected to a controller 285 to receive a control signal from the controller 285, thereby driving the slide mold 281 so that the slide mold is moved forward to and backward from the mounting surface 104.

When the extension portion 22 is held on the mounting surface 104, the controller 285 outputs a control signal to the fluid pressure cylinder 282, which drives the slide mold 281 so that the slide mold is moved forward to the mounting surface 104. When the slide mold 281 is moved to a forward limit position, the extension portion 22 is pressed against and comes in close contact with the mounting surface 104 by the pin member 283, to which a resilient force is applied. Accordingly, the extension portion 22 is held on the mounting surface 104 so that foam molding can be performed. When the filling process is finished, the controller 285 outputs a control signal to the fluid pressure cylinder 282, which then drives the slide mold 281 so that the slide mold is moved backward from the mounting surface 104.

Due to the non-interlocking with the operation where the mold 100 is closed, the extension portion 22 may be held on the mounting surface 104 from the time when the core 20 is completely disposed until the time when the mold 100 begins to be closed and the extension portion 22 interferes with the skin 30. Therefore, the time when the extension portion 22 is held on the mounting surface 104 can be arbitrarily selected and set so that work efficiency is improved.

Figure 32A:
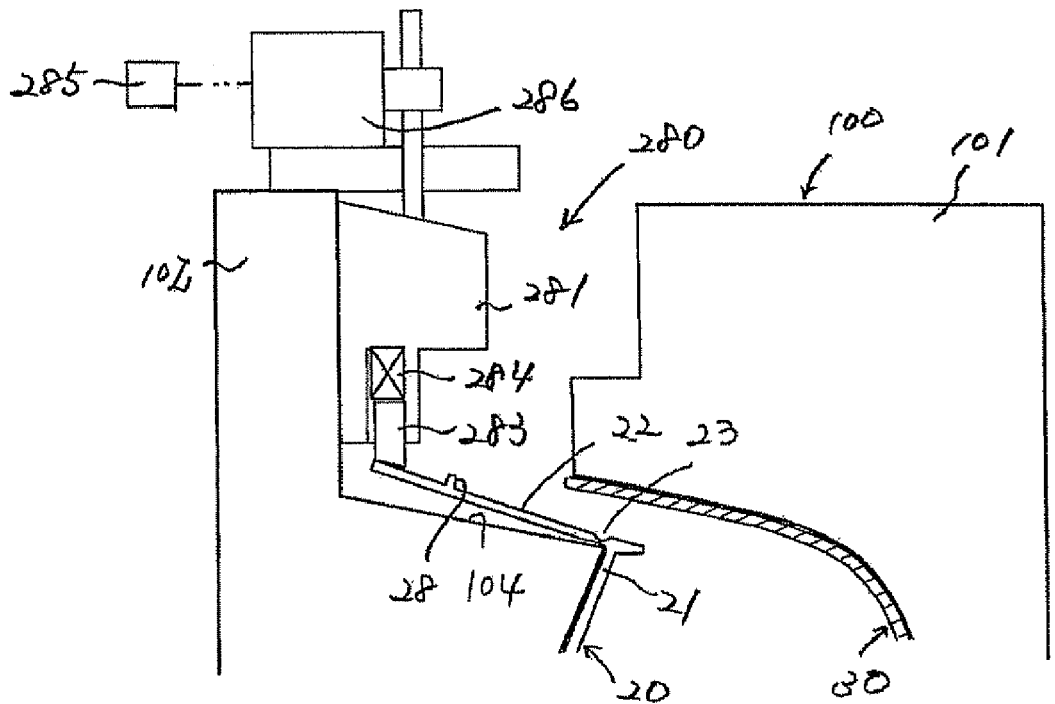
FIGS. 32A and 32B are cross-sectional views of a main portion used to describe a modification of the sixth embodiment.
Figure 32B:
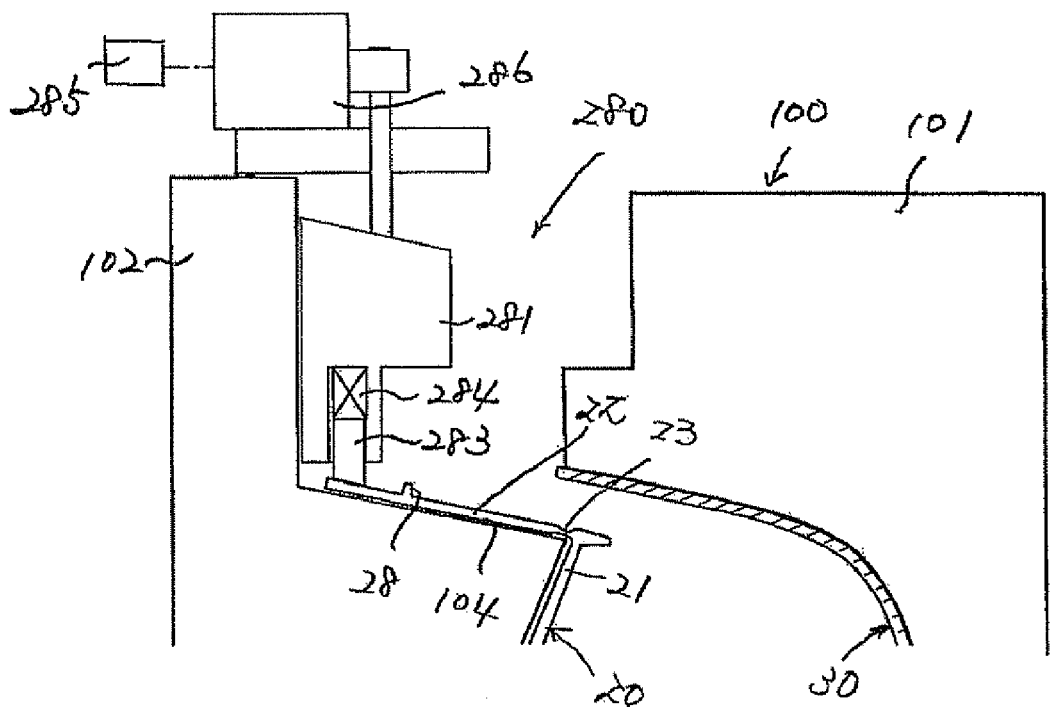

In the modification to the sixth embodiment shown in FIGS. 32A and 32B, an electric motor 286 is used as the drive member. The electric motor 286 is connected to a controller 285 to receive a control signal therefrom that drives the slide mold 281 so that the slide mold is moved forward to and backward from the mounting surface 104.

When the extension portion 22 is held on the mounting surface 104, the controller 285 outputs a control signal to the electric motor 286 to drive the slide mold 281 so that the slide mold is moved forward to the mounting surface 104. When the slide mold 281 is moved to a forward limit position, the extension portion 22 is pressed against and comes in close contact with the mounting surface 104 by the pin member 283, to which a resilient force is applied. Accordingly, the extension portion 22 is held on the mounting surface 104 so that the foam molding can be performed. When the filling process is finished, the controller 285 outputs a control signal to the electric motor 286, which then drives the slide mold 281 to move backward from the mounting surface 104.

A seventh embodiment is now described with reference to FIGS. 33 to 37.

Figure 33:
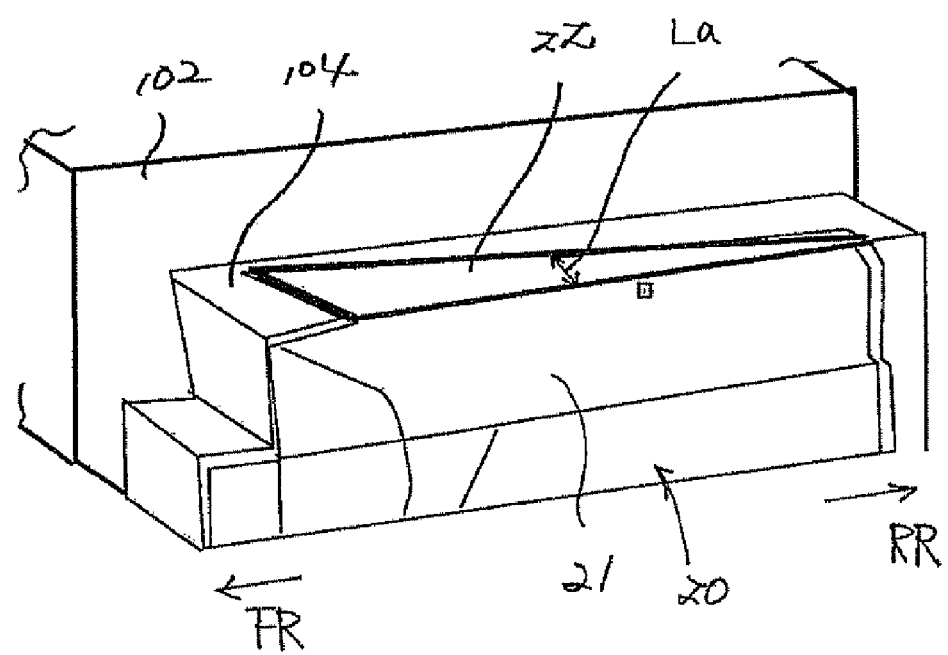
FIG. 33 is a perspective view showing a core of a seventh embodiment mounted on a core mold.

Referring first to FIG. 33, due to the formative design of a door trim or the restriction on the layout when the door trim is disposed in a vehicle cabin, a folding length La of an extension portion 22 is relatively long at the front portion (arrow FR) of a vehicle, and is relatively short at the rear portion (arrow RR) of the vehicle. The extension portion 22 can be pressed against the mounting surface 104 by a pressing unit 280 provided on the core mold 102 at the portion where the folding length La is relatively long. However, the extension portion may be difficult to press against the mounting surface 104 by the pressing unit 280 at the portion where the folding length La is relatively short (for example, about 15 mm or less). If the extension portion 22 cannot be fixed, there is a concern that the core 20 is not correctly positioned during the foam molding. According to the seventh embodiment, the portion where the folding length La is relatively short can be reliably held on the mounting surface 104. For convenience of description, the portion where the folding length La of the extension portion 22 is relatively long is referred to as an "FR side portion of the extension portion 22" and where the folding length La is relatively short is referred to as an "RR side portion of the extension portion 22".

In the seventh embodiment, the extension portion 22 is held on the mounting surface 104 without interlock with the operation where a core mold 102 and a cavity mold 101 approach each other.

Figure 34:
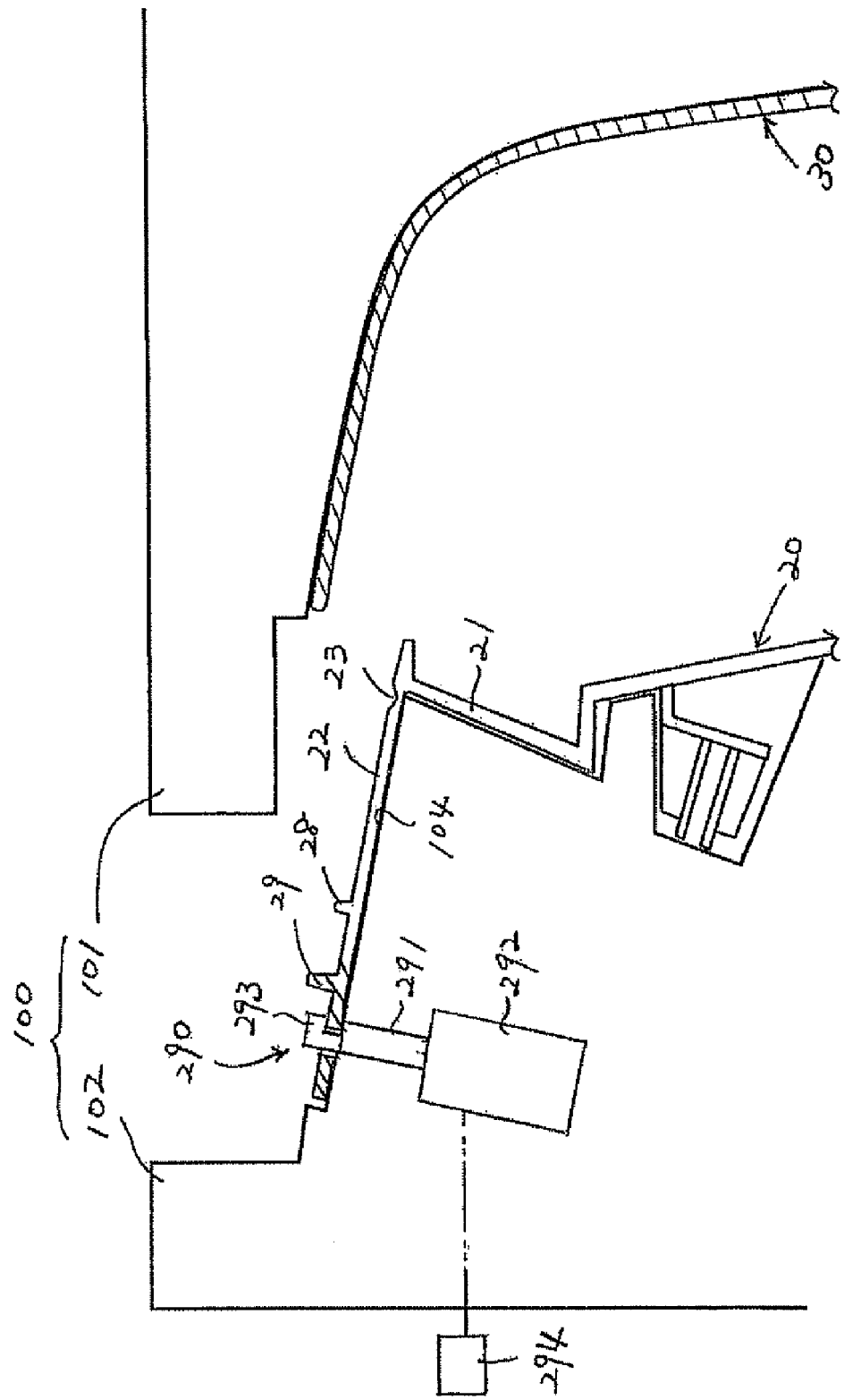
FIG. 34 is a cross-sectional view illustrating a main portion used to describe the seventh embodiment, and showing a portion where a pulling unit for pulling the extension portion from the mounting surface in order to hold the extension portion on the mounting surface is provided.

According to the seventh embodiment, the extension portion 22 is held on the mounting surface 104 by using different units at the FR side portion of the extension portion 22 and the RR side portion of the extension portion 22 as shown in FIG. 34. As for the FR side portion of the extension portion 22, the FR side portion of the extension portion 22 is pulled from the mounting surface 104 by the pulling unit 290 provided on the core mold 102 so that the FR side portion of the extension portion 22 is held on the mounting surface 104. The RR side portion of the extension portion 22 is sucked from the mounting surface 104 by the suction unit 300 provided on the core mold 102 so that the RR side portion of the extension portion 22 is held on the mounting surface 104.

Referring to FIGS. 34 and 35A to 35C, the pulling unit 290 includes a pin member 291 with an end protruding from the mounting surface 104 of the core mold 102 and includes a drive member 292. While rotating the pin member 291, the drive member 292 drives the pin member 291 so that the pin member 291 is moved forward and backward in an axial direction. A claw portion 293, which is caught by the extension portion 22 of the core 20, is provided at the end of the pin member 291. A through hole 25 into which a fixing boss 26 of a body portion 21 is inserted is formed in the extension portion 22 of the core 20. The through hole 25 has the shape of letter "D." While the end of the pin member 291 is inserted through the through hole 25, the extension portion 22 is set on the mounting surface 104 as shown in FIG. 35A. The drive member 292 is composed of a rotary cylinder. The rotary cylinder drive member 292 is connected to a controller 294 to receive a control signal, thereby rotating and driving the pin member 291 so that the pin member 291 is moved backward in the axial direction. After rotating the pin member 291 by an angle of 45°, the rotary cylinder drive member 292 drives the pin member 291 so that the pin member 291 is moved backward as shown in FIG. 35B. Accordingly, the claw portion 293 of the pin member 291 is caught by the peripheral portion of the through hole 25 as shown in FIG. 35C.

Figure 36A:
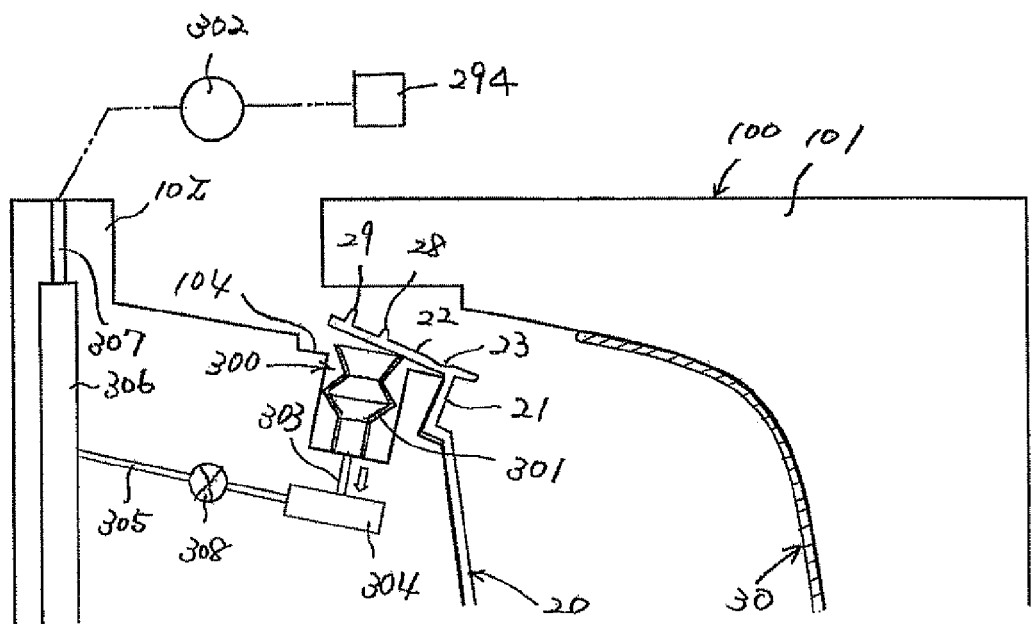
FIGS. 36A and 36B are cross-sectional views illustrating the seventh embodiment, and showing a portion where a suction unit for sucking the extension portion from the mounting surface in order to hold the extension portion on the mounting surface is provided.
Figure 36B:
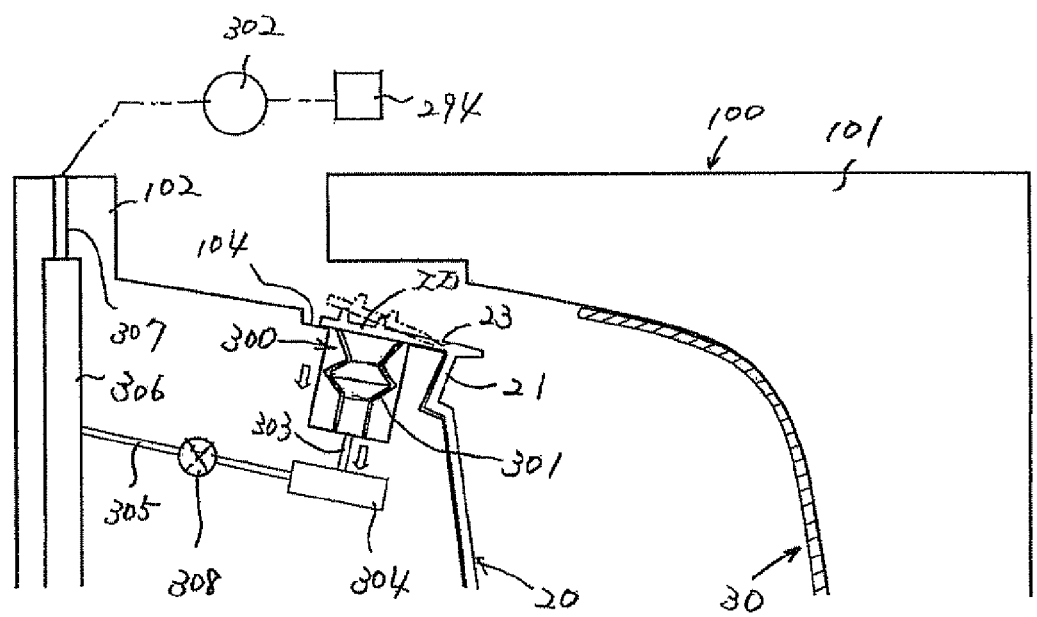
Figure 37:
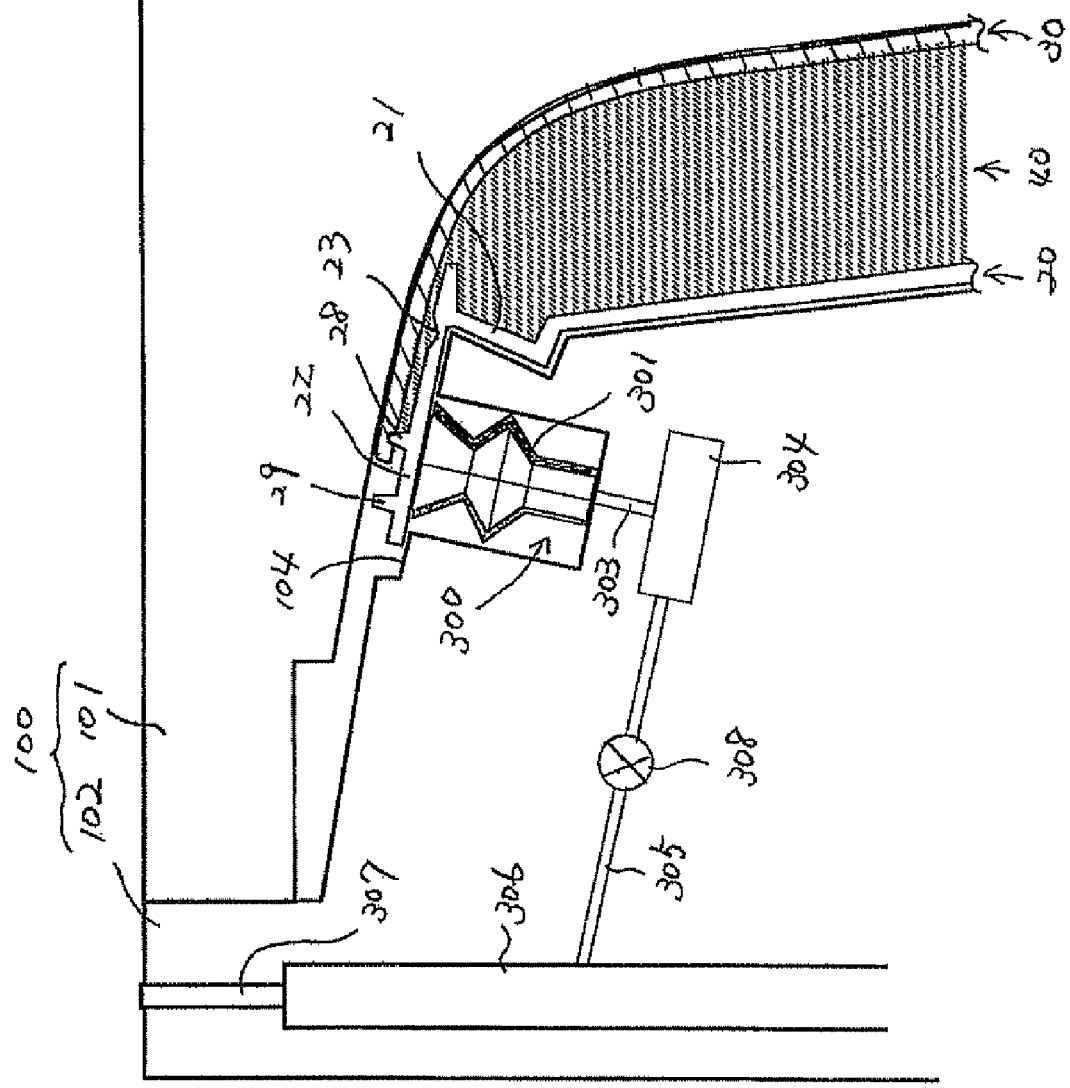
FIG. 37 is a cross-sectional view of a main portion used to describe the seventh embodiment.

Referring to FIGS. 36A, 36B and 37, the suction unit 300 includes a suction pad 301 that is disposed on the back side of the extension portion 22 and a vacuum unit 302 connected to the suction pad 301. An extensible bellows pad is used as the suction pad 301. The bellows pad 301 is mounted on the core mold 102 so that the end thereof protrudes from the mounting surface 104. The length of the portion of the bellows pad, which protrudes from the mounting surface 104, is the distance where the bellows pad 301 sucking the RR side portion of the extension portion 22 is displaced. For example, a vacuum pump is used as the vacuum unit 302. The bellows pad 301 and the vacuum pump 302 are connected to each other through paths 303, 305, and 307 and chambers 304 and 306, which are formed in the core mold 102. A valve 308 is disposed on the path 305. The valve allows the vacuum pump 302 and the chamber 304 to communicate with each other or not to communicate with each other, and releases vacuum. The vacuum pump 302 is connected to the controller 294 to receive a control signal, thereby being operated or stopped. The valve 308 is also connected to the controller 294 to receive a control signal, thereby allowing the vacuum pump 302 and the chamber 304 to communicate with each other (ON), not to communicate with each other (OFF), or to release vacuum.

A rib portion 28 is also formed on the RR side portion of the extension portion 22. While the end of the pin member 291 is inserted through the through hole 25, the extension portion 22 is set on the mounting surface 104.

When the extension portion 22 is held on the mounting surface 104, the controller 294 outputs a control signal to the rotary cylinder drive member 292, which moves the pin member 291 backward in the axial direction so that the pin member 291 is rotated by an angle of 45° and the claw portion 293 is pulled toward the mounting surface 104. Accordingly, the claw portion 293 of the pin member 291 is caught by the peripheral portion of the through hole 25 as shown in FIG. 35C, and the FR side portion of the extension portion 22 is pulled from the mounting surface 104 and comes in close contact with the mounting surface. As a result, the FR side portion of the extension portion is held on the mounting surface 104.

Further, the controller 294 outputs control signals to the vacuum pump 302 and the valve 308, and operates the vacuum pump 302 to communicate with the chamber 304 (ON) and provide negative pressure to the bellows pad 301 as shown in FIG. 36A. The bellows pad 301 sucks the back surface of the RR side portion of the extension portion 22 and contracts so that the RR side portion of the extension portion 22 is pulled toward the mounting surface 104 as shown in FIG. 36B. Accordingly, the RR side portion of the extension portion 22 is sucked from the mounting surface 104 and comes in close contact with the mounting surface 104 so that the extension portion 22 is held on the mounting surface 104.

In this way, while the FR side portion and the RR side portion of the extension portion 22 come in close contact with and are held on the mounting surface 104, the foam molding can be performed as shown in FIG. 37. When the filling process is finished, the controller 294 outputs a control signal to the rotary cylinder drive member 292. The pin member 291 is driven to be moved forward in the axial direction and releases the claw portion 293 caught by the peripheral portion of the through hole 25. Then, the pin member 291 is rotated in a reverse direction by an angle of 45° and returns to the initial position. Further, the controller 294 also outputs a control signal to the valve 308, allows the vacuum pump 302 and the chamber 304 not to communicate with each other (OFF), and releases vacuum.

Due to the non-interlocking with the operation where the mold 100 is closed, the FR side portion and the RR side portion of the extension portion 22 may be held on the mounting surface 104 from the time when the core 20 is completely disposed until the time when the mold 100 begins to be closed and the extension portion 22 interferes with the skin 30. Therefore, the time when the extension portion 22 is held on the mounting surface 104 can be arbitrarily selected and set so that work efficiency is improved.

A suction mark of the bellows pad 301 remains on the back surface of the RR side portion of the extension portion 22. However, since the core 20 is not exposed to the outside, this does not affect the appearance quality.

As for the pulling unit 290, the claw portion 293 of the pin member 291 is caught by the peripheral portion of the through hole 25 in the illustrated embodiment. When the extension portion 22 of the core 20 with the through hole 25 or the portion without the through hole 25 is held on the mounting surface 104, the extension portion 22 may be held on the mounting surface 104 by allowing the claw portion 293 to be caught by the peripheral portion of the extension portion 22 and pulling the extension portion 22 from the mounting surface 104.

Further, the pulling unit 290 may be applied to other embodiments, such as the first, second and third embodiments. If the pulling unit 290 is applied to the first and second embodiments, the extension portion 22 is held on the mounting surface 104 by allowing the claw portion 293 of the pin member 291 to be caught by the peripheral portion of the through hole 25, pulling the extension portion 22 from the mounting surface 104. If the pulling unit 290 is applied to the third embodiment, the extension portion 22 is held on the mounting surface 104 by allowing the claw portion 293 of the pin member 291 to be caught by the peripheral portion of the second through hole 233 formed in the folding-back portion 231, pulling the extension portion 22 from the mounting surface 104

Figure 38A:
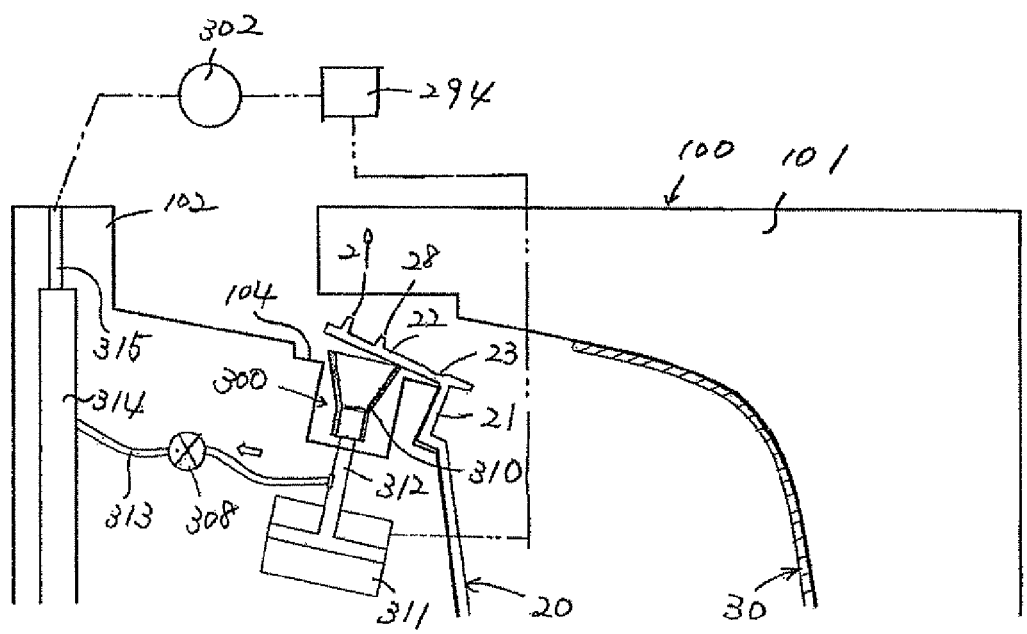
FIGS. 38A and 38B are cross-sectional views of a main portion used to describe a modification of the seventh embodiment.
Figure 38B:
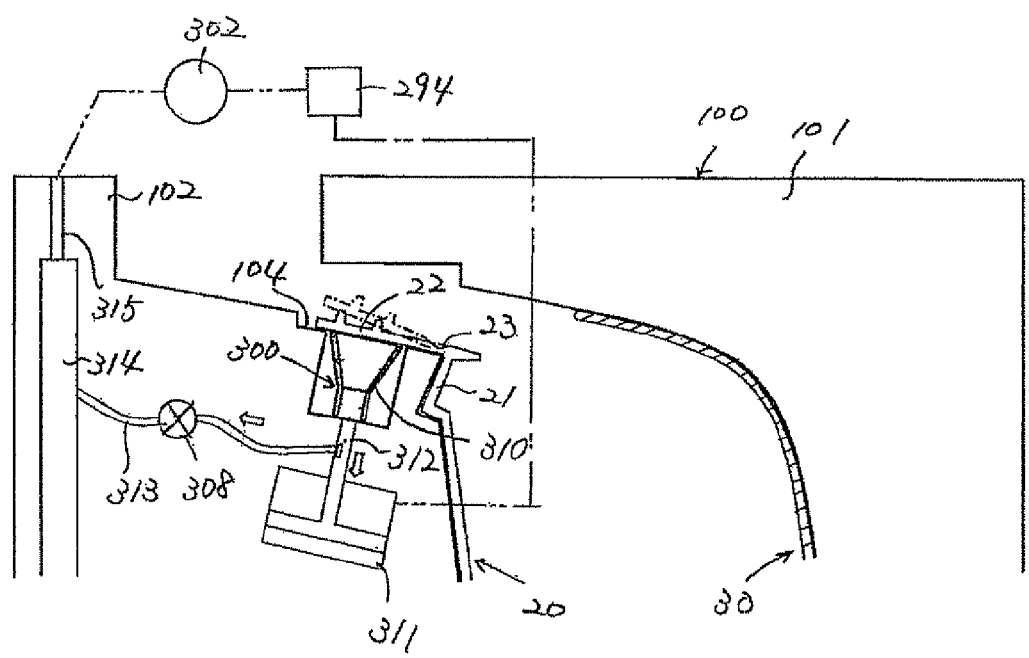

In the modification to the seventh embodiment shown in FIGS. 38A and 38B, the suction unit 300 includes a suction pad 310 that is disposed on the back side of the extension portion 22, a vacuum pump 302 connected to the suction pad 310 and a drive member 311 for driving the suction pad 310 forward and backward in an axial direction. A rubber pad 310 is used as the suction pad 310. The rubber pad 310 is not extensible, unlike the bellows pad 301. The rubber pad 310 is movably mounted on the core mold 102 so that an end thereof protrudes from the mounting surface 104. The length of the portion of the rubber pad 310 that protrudes from the mounting surface 104 is the distance where the rubber pad 310 sucking the RR side portion of the extension portion 22 is displaced. For example, an air cylinder is used as the drive member 311. The rubber pad 310 and the vacuum pump 302 are connected to each other through a hollow rod 312 of the air cylinder 311, a path 315 formed in the core mold 102, a chamber 314 and a flexible tube 313 that connects the chamber 314 with the hollow rod 312. The air cylinder 311 is also connected to a controller 294 to receive a control signal, thereby driving the rubber pad 310 forward and backward in an axial direction.

The air cylinder 311 drives the rubber pad 310 so that the rubber pad is moved forward and backward, and the end of the rubber pad 310 protrudes from the mounting surface 104. In this state, the RR side portion of the extension portion 22 is set on the mounting surface 104.

When the extension portion 22 is held on the mounting surface 104, the controller 294 outputs control signals to the vacuum pump 302 and the valve 308 and operates the vacuum pump 302 so that the vacuum pump 302 communicates with the rubber pad 310 (ON) and provides negative pressure to the rubber pad 310 as shown in FIG. 38A. The rubber pad 310 sucks the back surface of the RR side portion of the extension portion 22. After that, the controller 294 outputs a control signal to the air cylinder 311 and moves the rubber pad 310 backward in the axial direction so that the RR side portion of the extension portion 22 is pulled toward the mounting surface 104 as shown in FIG. 38B. Accordingly, the RR side portion of the extension portion 22 is sucked from the mounting surface 104 and comes in close contact with the mounting surface. As a result, the RR side portion of the extension portion is held on the mounting surface 104.

In this way, while the FR side portion and the RR side portion of the extension portion 22 come in close contact with and are held on the mounting surface 104, the foam molding can be performed. When the filling process is finished, the controller 294 outputs a control signal to the valve 308 and prevents the vacuum pump 302 and the rubber pad 310 from communicating with each other (OFF), releasing the vacuum. The air cylinder 311 holds the rubber pad 310 at a backward limit position.

The seventh embodiment and the modification thereof disclose examples where the FR side portion of the extension portion 22 is pulled by the pulling unit 290 and the RR side portion of the extension portion 22 is sucked by the suction unit 300. The FR side portion of the extension portion 22 may be held on the mounting surface 104 by sucking the FR side portion of the extension portion 22 toward the mounting surface 104 by the suction unit 300.

Figure 39:
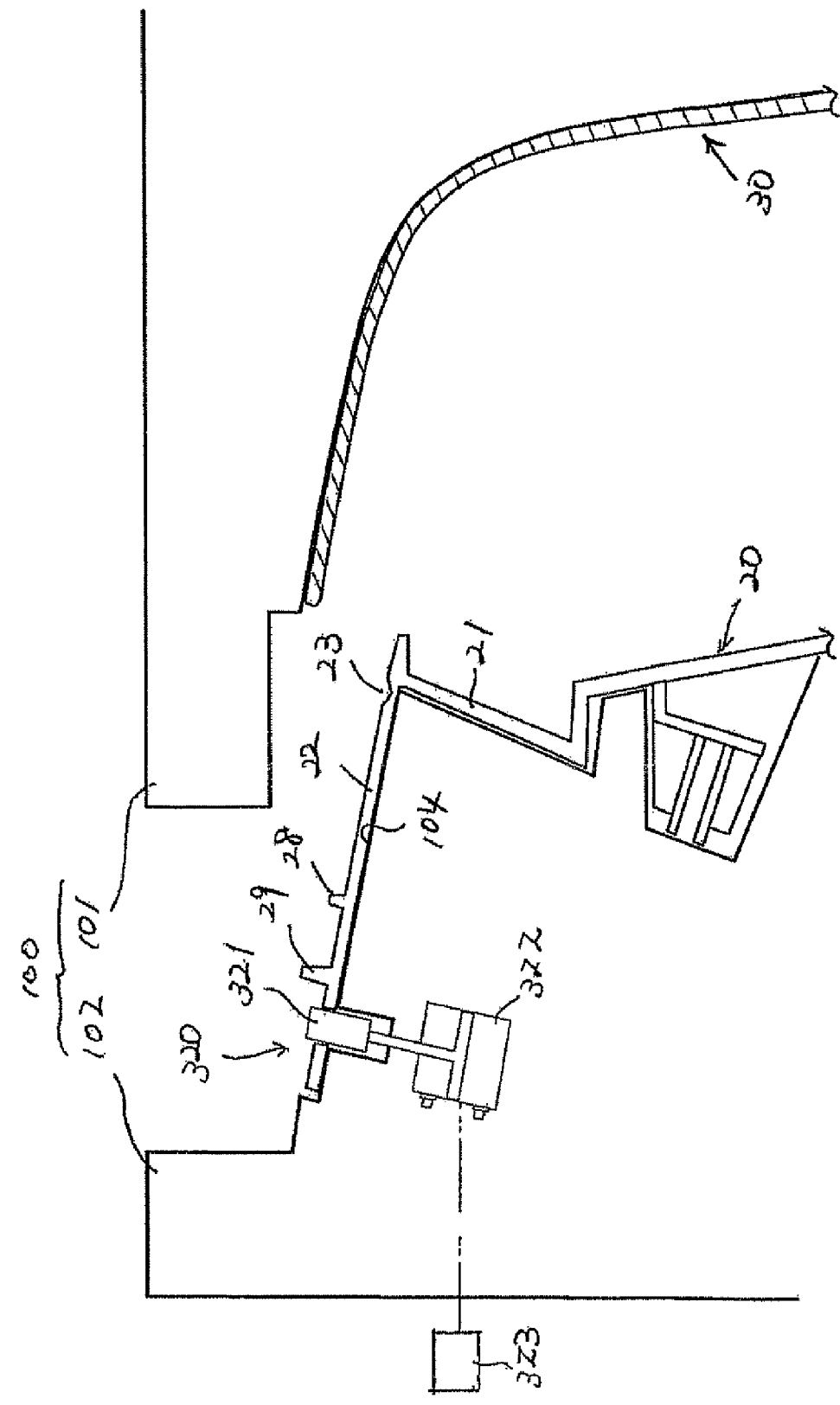
FIG. 39 is a cross-sectional view of a main portion used to describe another modification of the seventh embodiment.

FIG. 39 is a cross-sectional view of a main portion used to describe another modification of the seventh embodiment. Therein, a folding length La of the FR side portion of the extension portion 22 is relatively long. Therefore, the deformation length from the mounting surface 104 is small in comparison with the RR side portion, and it may not be necessary to pull the extension portion from the mounting surface 104 due to its own weight. In this case, it is only necessary to position the FR side portion of the extension portion 22 on the mounting surface 104. In this modification, a regulation unit 320, which positions the FR side portion of the extension portion 22, is provided on the core mold 102 at the FR side portion of the extension portion 22 instead of the pulling unit 290.

The regulation unit 320 includes a pin member 321 with an end protruding from the mounting surface 104 of the core mold 102 and includes a drive member 322 for driving the pin member 321 to move forward and backward in an axial direction. It is preferable, but not necessary, that the pin member 321 have a diameter to be inserted through the through hole 25 and a tapered truncated conical shape. The pin member 321 is inserted through the through hole 25 so that the FR side portion of the extension portion 22 is easily positioned. For example, an air cylinder is used as the drive member 322. The air cylinder 322 is connected to a controller 323 to receive a control signal, thereby driving the pin member 321 backward in an axial direction.

After the core 20 is mounted on the mounting surface 104 of the core mold 102, the controller 323 outputs a control signal to the air cylinder 322 and drives the pin member 321 forward and backward in the axial direction. The pin member 321 is inserted through the through hole 25 so that the FR side portion of the extension portion 22 is positioned.

In this way, while the FR side portion of the extension portion 22 is positioned and the RR side portion comes in close contact with and is held on the mounting surface 104, the foam molding can be performed. When the filling process is finished, the controller 323 outputs a control signal to the valve 308 and holds the pin member 321 at a backward limit position.

Embodiments where the invention is applied to an automobile interior part have been described, but the present invention is not limited thereto. Needless to say, the invention may be widely applied to a foam-molded member having a skin.

Accordingly, the above-described embodiments have been described in order to allow easy understanding of the invention and do not limit the invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A foam-molded member having a skin, comprising:
   a core including a body portion, an extension portion and a folding portion between the body portion and extension portion, the extension portion configured to fold at the folding portion into a folded position adjacent the body portion;
   a skin opposing the core;
   a foam between at least the body portion and the skin; and
   a fixing member configured to fix the extension portion of the core to the body portion when the extension portion of the core is in the folded position.

2. The foam-molded member according to claim 1 wherein the foam is between the extension portion and the skin.

3. The foam-molded member according to claim 1 wherein the folding portion comprises a hinge portion thinner than the body portion and the extension portion.

4. The foam-molded member according to claim 1, further comprising:
   a rib portion extending from the extension portion, the rib portion forming a seal portion between the skin and the extension portion, wherein the seal portion is configured to retain the foam while releasing a gas.

5. The foam-molded member according to claim 1, further comprising:
   a flange extending from the extension portion; and
   a part mounted on the flange and configured to cover an end portion of the skin.

6. The foam-molded member according to claim 5 wherein the skin forms a surface of an automobile interior part and the part is a door weatherstrip.

7. The foam-molded member according to claim 1 wherein the skin forms a surface of an automobile interior part.

8. The foam-molded member according to claim 1 wherein the fixing member comprises:
   a fixing boss extending from the body portion;
   a through hole in the extension portion and configured to align with the fixing boss when the extension portion is in the folded position; and an attachment fixture fixedly received by the through hole and fixing boss.

9. The foam-molded member according to claim 1 wherein the fixing member comprises a pair of fitting members having a first fitting member extending from the extension portion and a second fitting member extending from the body portion, the pair of fitting members configured to matingly secure the extension portion in the folded position.

10. The foam-molded member according to claim 9 wherein one of the pair of fitting members includes a claw member configured to engage with and disengage from the other of the pair of fitting members.

11. The foam-molded member according to claim 1 wherein the fitting member comprises a fitting protrusion formed on the extension portion and a fitting recess formed on the body portion, the fitting recess configured to fixedly retain the fitting protrusion.

12. The foam-molded member according to claim 1 wherein the extension portion of the core further includes a second folding portion located at an end of the extension portion opposite the body portion, wherein the second folding portion is configured to be folded so as to be superposed on the extension portion.

13. The foam-molded member according to claim 12 wherein the second folding portion superposed on the extension portion is configured for attachment to the body portion by the fixing member.

* * * * *